United States Patent
Hu et al.

(10) Patent No.: US 9,844,107 B2
(45) Date of Patent: Dec. 12, 2017

(54) HIGH EFFICIENCY DRIVER CIRCUITRY FOR A SOLID STATE LIGHTING FIXTURE

(71) Applicant: Cree, Inc., Durham, NC (US)

(72) Inventors: Yuequan Hu, Morrisville, NC (US); Nicholas William Medendorp, Jr., Raleigh, NC (US); Douglas E. Keiter, Apex, NC (US)

(73) Assignee: Cree, Inc., Durham, NC (US)

( * ) Notice: Subject to any disclaimer, the term of this patent is extended or adjusted under 35 U.S.C. 154(b) by 350 days.

(21) Appl. No.: 14/467,251

(22) Filed: Aug. 25, 2014

(65) Prior Publication Data

US 2016/0057825 A1 Feb. 25, 2016

(51) Int. Cl.
*H05B 33/08* (2006.01)

(52) U.S. Cl.
CPC ..... *H05B 33/0815* (2013.01); *H05B 33/0803* (2013.01); *H05B 33/0851* (2013.01)

(58) Field of Classification Search
CPC .... H05B 37/02; H05B 33/08; H05B 33/0815; H05B 33/0812; H05B 33/0803; H05B 33/0851; H01L 29/1608
USPC ........ 315/200 R, 209 R, 291, 307, 308, 312, 315/151, 185 R
See application file for complete search history.

(56) References Cited

U.S. PATENT DOCUMENTS

| | | | |
|---|---|---|---|
| 6,246,592 B1 | 6/2001 | Balogh et al. | |
| 7,888,881 B2 | 2/2011 | Shteynberg et al. | |
| 9,178,415 B1* | 11/2015 | Kost | H02M 3/00 |
| 2008/0018261 A1 | 1/2008 | Kastner | |
| 2008/0197817 A1* | 8/2008 | Colbeck | H02M 1/4225 323/205 |
| 2008/0224625 A1 | 9/2008 | Greenfeld | |
| 2008/0224636 A1 | 9/2008 | Melanson | |
| 2008/0237613 A1 | 10/2008 | Lee et al. | |
| 2009/0058567 A1 | 3/2009 | Dutta | |
| 2009/0236595 A1 | 9/2009 | Atanackovic | |
| 2009/0267085 A1 | 10/2009 | Lee et al. | |
| 2009/0323323 A1 | 12/2009 | Liu et al. | |
| 2010/0213859 A1 | 8/2010 | Shteynberg et al. | |
| 2010/0253312 A1 | 10/2010 | Morimoto | |
| 2011/0304270 A1 | 12/2011 | Scarpelli | |
| 2011/0304311 A1 | 12/2011 | Takahashi et al. | |
| 2013/0015768 A1* | 1/2013 | Roberts | H05B 33/0815 315/122 |

OTHER PUBLICATIONS

Optimum Semiconductors for High-Power Electronics, by Shenai, IEEE 1989.*

(Continued)

*Primary Examiner* — Jimmy Vu
(74) *Attorney, Agent, or Firm* — Anthony J. Josephson

(57) ABSTRACT

Driver circuitry is coupled between a power supply and at least one LED in a solid-state lighting fixture, such that a non-isolated direct current (DC) path exists between the power supply and the at least one LED. The driver circuitry is configured to receive an AC input voltage and generate a driver output current for driving the at least one LED from the AC input voltage. By using driver circuitry that is non-isolated from the at least one LED in the solid-state lighting fixture, the efficiency of the driver circuitry may be increased, while simultaneously reducing the cost and complexity of the driver circuitry compared to conventional driver circuitry.

28 Claims, 16 Drawing Sheets

(56) References Cited

OTHER PUBLICATIONS

Shenai, Krishna, "Optimum Semiconductors for High-Power Electronics," Electron Devices, vol. 36, Issue 9, Sep. 1989, IEEE, pp. 1811-1823.
Non-Final Office Action for U.S. Appl. No. 14/467,240, dated Jun. 19, 2015, 22 pages.
Final Office Action for U.S. Appl. No. 14/467,240, dated Dec. 4, 2015, 21 pages.
Advisory Action for U.S. Appl. No. 14/467,240, dated Feb. 10, 2016, 3 pages.
Non-Final Office Action for U.S. Appl. No. 14/467,240, dated Feb. 14, 2017, 30 pages.
Final Office Action for U.S. Appl. No. 14/467,240, dated Aug. 28, 2017, 31 pages.

\* cited by examiner

US 9,844,107 B2

HIGH EFFICIENCY DRIVER CIRCUITRY FOR A SOLID STATE LIGHTING FIXTURE

FIELD OF THE DISCLOSURE

The present disclosure relates to solid-state lighting fixtures. Specifically, the present disclosure relates to light-emitting diode (LED) based lighting fixtures including high-efficiency and high power-density driver circuitry using silicon carbide (SiC) switching components.

BACKGROUND

Continuing advancements in solid-state lighting technologies, and specifically light-emitting diodes (LEDs), continue to result in remarkable performance improvements when compared to their incandescent and fluorescent counterparts. Generally, LED-based lighting fixtures are more efficient, last longer, are more environmentally friendly, and require less maintenance than incandescent and fluorescent lighting fixtures. Accordingly, LEDs are poised to replace conventional lighting technologies in applications such as traffic lights, automobiles, general-purpose lighting, and liquid-crystal-display (LCD) backlighting.

LED lighting fixtures are driven by a linear (i.e., direct current) driver signal or a pulse-width modulated (PWM) driver signal. Since most lighting fixtures receive power from an alternating current (AC) power source, power conversion must be performed by driver circuitry in order to produce a desired light output from the LED lighting fixture. While the color of light emitted from an LED primarily depends on the composition of the material used to fabricate the LED, the light output of an LED is directly related to the current flowing through the P-N junction of the LED. Accordingly, driver circuitry capable of providing a constant current is desirable for an LED lighting fixture.

FIG. 1 shows conventional driver circuitry 10 for an LED lighting fixture. For context, a power supply 12, an electromagnetic interference (EMI) filter 14, control circuitry 16, and an LED light source 18 are also shown. The conventional driver circuitry 10 includes rectifier circuitry 20, power factor correction (PFC) circuitry 22, and DC-DC converter circuitry 24. The rectifier circuitry 20 is a bridge rectifier including a first rectifier input node 26A, a second rectifier input node 26B, a rectifier output node 28, a first rectifier diode $D_{R1}$, a second rectifier diode $D_{R2}$, a third rectifier diode $D_{R3}$, and a fourth rectifier diode $D_{R4}$. The first rectifier diode $D_{R1}$ includes an anode coupled to the first rectifier input node 26A and a cathode coupled to the rectifier output node 28. The second rectifier diode $D_{R2}$ includes an anode coupled to the second rectifier input node 26B and a cathode coupled to the rectifier output node 28. The third rectifier diode $D_{R3}$ includes an anode coupled to ground and a cathode coupled to the first rectifier input node 26A. The fourth rectifier diode $D_{R4}$ includes an anode coupled to ground and a cathode coupled to the second rectifier input node 26B. The first rectifier input node 26A is coupled to a positive output of the power supply 12, which is filtered via the EMI filter 14. The second rectifier input node 26B is coupled to a negative output of the power supply 12, which is also filtered via the EMI filter 14.

The PFC circuitry 22 is a boost converter including a boost input node 30, a boost output node 32, a boost inductor $L_B$, a boost switch $Q_B$, a boost diode $D_B$, and a boost capacitor $C_B$. The boost inductor $L_B$ is coupled between the boost input node 30 and an intermediary boost node 34. The boost switch $Q_B$ is coupled between the intermediary boost node 34 and ground. The boost diode $D_B$ is coupled between the intermediary boost node 34 and the boost output node 32. Finally, the boost capacitor $C_B$ is coupled between the boost output node 32 and ground. The boost input node 30 is coupled to the rectifier output node 28 of the rectifier circuitry 20.

The DC-DC converter circuitry 24 is a flyback converter including a flyback input node 36, a flyback output node 38, a flyback transformer $T_{FB}$, a flyback switch $Q_{FB}$, a flyback diode $D_{FB}$, and a flyback capacitor $C_{FB}$. The flyback transformer $T_{FB}$ includes a primary winding 40 coupled in series with the flyback switch $Q_{FB}$ between the flyback input node 36 and ground. Further, the flyback transformer $T_{FB}$ includes a secondary winding 42 coupled between an anode of the flyback diode $D_{FB}$ and ground, wherein the cathode of the flyback diode $D_{FB}$ is in turn coupled to the flyback output node 38. Finally, the flyback capacitor $C_{FB}$ is coupled between the flyback output node 38 and ground. The flyback input node 36 is coupled to the boost output node 32, while the flyback output node 38 is coupled to the LED light source 18. In some cases, an additional switch (not shown) may be coupled between the LED light source 18 and ground, such that the additional switch operates to pulse-width modulate the current through the LED light source 18 in order to generate a desired light output.

In operation, an EMI-filtered AC input voltage from the power supply 12 is received at the rectifier circuitry 20, where it is rectified to generate a rectified voltage. The rectified voltage is then received by the PFC circuitry 22, which performs power factor correction and boosts the voltage of the signal to generate a direct current (DC) PFC voltage. The DC-DC converter circuitry 24 receives the PFC voltage and regulates a driver output current, which is used to drive the LED light source 18. The control circuitry 16, which may be separated into discrete PFC control circuitry, DC-DC control circuitry, and dimming control circuitry in some cases, operates the boost switch $Q_B$ and the flyback switch $Q_{FB}$ to generate a desired driver output current. While effective at generating a driver output current that is suitable for driving the LED light source 18, the conventional driver circuitry 10 shown in FIG. 1 generally suffers from low efficiency due to the use of a flyback converter topology for the DC-DC converter circuitry 24. That is, the isolated nature of the flyback converter restricts the efficiency of the DC-DC converter circuitry 24, thereby increasing the power consumption and heat production thereof.

Notably, the switching components in the conventional driver circuitry 10, (i.e., the boost switch $Q_B$, the boost diode $D_B$, the flyback switch $Q_{FB}$, and the flyback diode $D_{FB}$) are silicon (Si) parts, which further hampers the performance of the conventional driver circuitry 10. Specifically, because of the use of silicon (Si) switching components in the conventional driver circuitry 10, the switching frequency and power handling capability of these components is significantly limited. Accordingly, the acceptable voltage range of the AC input voltage as well as the output voltage and current of the conventional driver circuitry 10 are likewise limited. Since the AC input voltage may vary significantly (i.e. from 208V to 480V depending on the infrastructure of the country in which the lighting fixture is deployed), the limited input voltage of the conventional driver circuitry 10 may result in the need to design separate driver circuitry for each country or region in which the driver circuitry is to be sold or used, thereby driving up the cost of manufacturing. Further, since the power handling capability of silicon (Si) devices is limited, the switching devices must be made large for high power applications, and further may produce excessive amounts of heat, resulting in lighting fixtures that are bulky or otherwise undesirable.

FIG. 2 shows the conventional driver circuitry 10 wherein the DC-DC converter circuitry 24 is a half-bridge LLC converter. The DC-DC converter circuitry 24 thus includes a half-bridge input node 44, a half-bridge output node 46, a first half-bridge switch $Q_{HB1}$, a second half-bridge switch $Q_{HB2}$, a first half-bridge capacitor $C_{HB1}$, a half-bridge inductor $L_{HB}$, a half-bridge transformer $T_{HB}$, a first half-bridge diode $D_{HB1}$, a second half-bridge diode $D_{HB2}$, and a second half-bridge capacitor $C_{HB2}$. The first half-bridge switch $Q_{HB1}$ is coupled between the half-bridge input node 44 and a half-bridge intermediary node 48. The second half-bridge switch $Q_{HB2}$ is coupled between the half-bridge intermediary node 48 and ground. The first half-bridge capacitor $C_{HB1}$, the half-bridge inductor $L_{HB}$, and a primary winding 50 of the half-bridge transformer $T_{HB}$ are coupled in series between the half-bridge intermediary node 48 and ground. A second center-tapped winding 52 of the half-bridge transformer $T_{HB}$ is coupled between an anode of the first half-bridge diode $D_{HB1}$ and an anode of the second half-bridge diode $D_{HB2}$, while the center-tap of the second center-tapped winding 52 is coupled to ground. The cathode of the first half-bridge diode $D_{HB1}$ and the cathode of the second half-bridge diode $D_{HB2}$ are each coupled to the half-bridge output node 46. Finally, the second half-bridge capacitor $C_{HB2}$ is coupled between the half-bridge output node 46 and ground. The half-bridge input node 44 is coupled to the boost output node 32, while the half-bridge output node 46 is coupled to the LED light source 18.

The conventional driver circuitry 10 shown in FIG. 2 functions in a substantially similar manner to the conventional driver circuitry 10 shown in FIG. 10, substituting the principles of operation of a flyback converter for that of an LLC half-bridge converter. Using an LLC half-bridge converter for the DC-DC converter circuitry results in an increase in the efficiency of the conventional driver circuitry 10, however, such a performance increase comes at the expense of increased complexity, cost, and area. Further, the switching components (i.e., the boost switch $Q_B$, the boost diode $D_B$, the first half-bridge switch $Q_{HB1}$, the second half-bridge switch $Q_{HB2}$, the first half-bridge diode $D_{HB1}$, and the second half-bridge diode $D_{HB2}$) are also silicon (Si) components in the conventional driver circuitry 10 shown in FIG. 2, which once again results in the same limits on the performance of the circuitry as discussed above with respect to FIG. 1.

Accordingly, there is a need for compact driver circuitry for a solid-state lighting fixture that is capable of delivering a constant output current while operating efficiently over a wide range of input voltages.

SUMMARY

The present disclosure relates to driver circuitry for solid-state lighting fixtures. In one embodiment, driver circuitry is configured to drive at least one light emitting diode (LED) in a solid-state lighting fixture at an efficiency greater than about 90% over at least a portion of an input voltage range between about 185V and 528V. The increased efficiency of the driver circuitry may reduce the operating cost and longevity of the solid-state lighting fixture.

In one embodiment, circuitry includes an input node, an output node, and driver circuitry. The input node is coupled to a power supply, which is configured to deliver an alternating current (AC) input voltage. The output node is coupled to at least one LED in a solid-state lighting fixture, such that a non-isolated direct current (DC) path exists between the input node and the output node. The driver circuitry resides in the non-isolated DC path between the input node and the output node, and is configured to receive the AC input voltage from the power supply and generate a driver output current for driving the LEDs from the AC input voltage using one or more switching components in the driver circuitry. By using driver circuitry that is non-isolated from the LEDs in the solid-state lighting fixture, the efficiency of the driver circuitry may be increased, while simultaneously reducing the cost and complexity of the driver circuitry compared to conventional driver circuitry.

In one embodiment, the one or more switching components in the driver circuitry are silicon carbide (SiC) switching components.

In one embodiment, the driver circuitry includes rectifier circuitry, power factor correction (PFC) circuitry, and DC-DC converter circuitry. The rectifier circuitry is configured to receive and rectify the AC input voltage to generate a rectified voltage. The PFC circuitry is coupled to the rectifier circuitry and configured to receive and provide PFC to the rectified voltage to generate a PFC output voltage. The DC-DC converter circuitry is coupled to the PFC circuitry and configured to receive the PFC output voltage and regulate a driver output current for driving the LEDs in the solid-state lighting fixture.

In one embodiment, the power factor correction circuitry is a power factor correction (PFC) boost converter.

In one embodiment, the PFC boost converter is configured to operate in a continuous conduction mode (CCM).

In one embodiment, circuitry includes an input node, an output node, and driver circuitry. The input node is coupled to a power supply, which is configured to supply an AC input voltage. The output node is coupled to at least one LED in a solid-state lighting fixture. The driver circuitry is coupled between the input node and the output node and is configured to receive the AC input voltage from the power supply, and operate in a CCM to generate a driver signal for operating the LEDs from the AC input voltage signal using one or more switching components in the driver circuitry. By operating the driver circuitry in a CCM, the efficiency of the driver circuitry may be increased when compared to conventional driver circuitry.

In one embodiment, the one or more switching components in the driver circuitry are silicon carbide (SiC) switching components.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
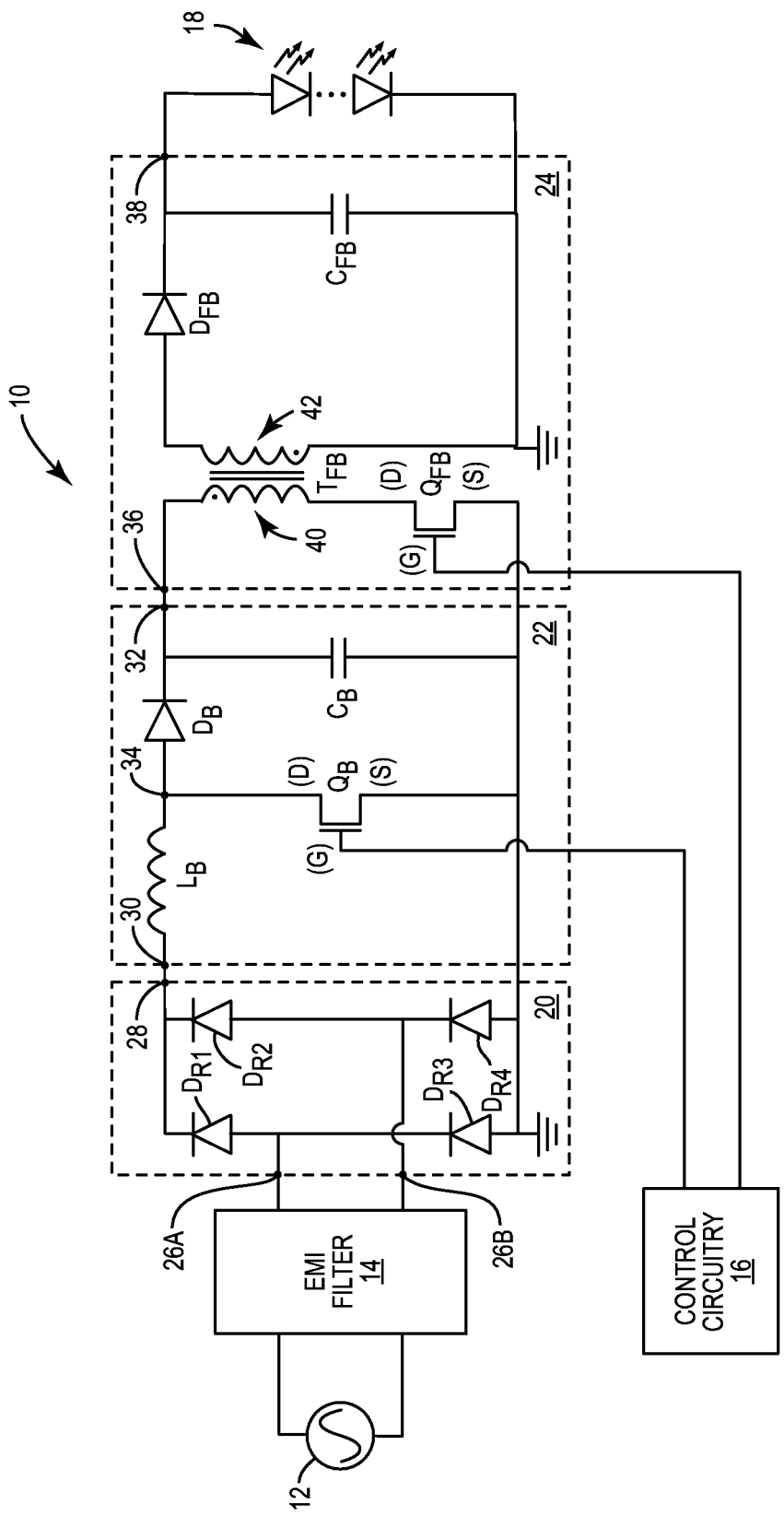
FIG. 1 is a schematic representation of conventional driver circuitry for a solid-state lighting fixture.
Figure 2:
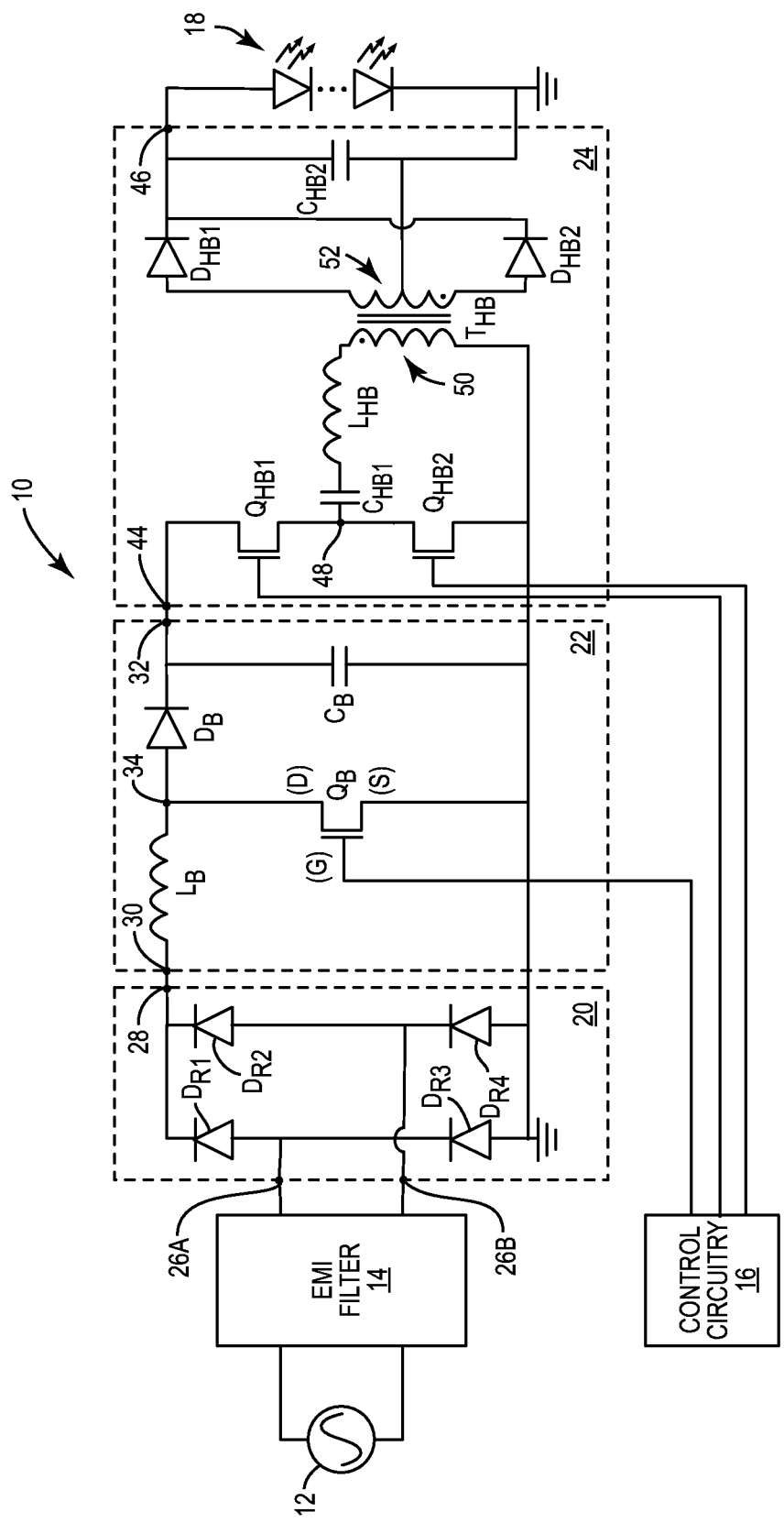
FIG. 2 is a schematic representation of the conventional driver circuitry shown in FIG. 1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
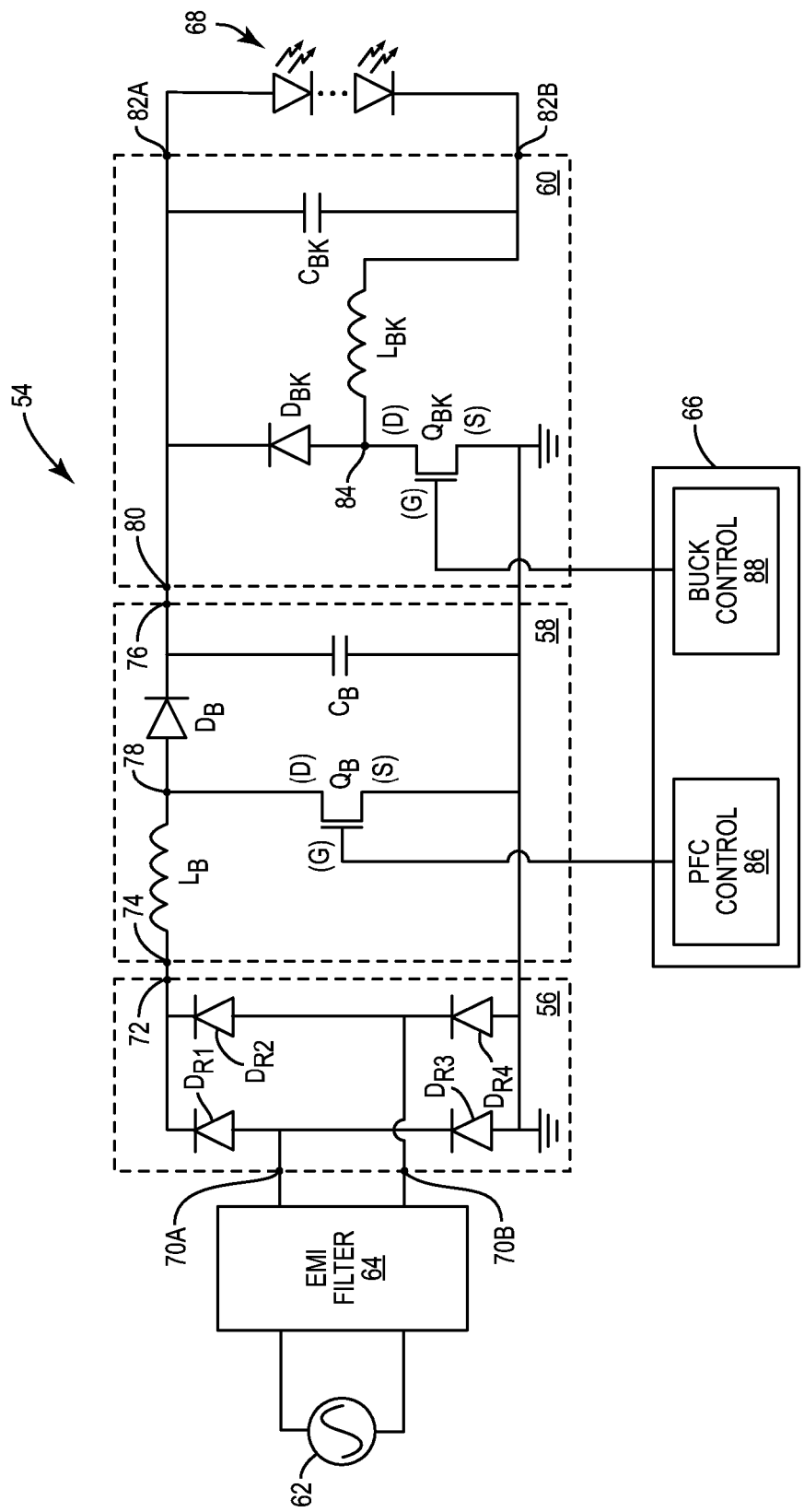
FIG. 3 is a schematic representation of driver circuitry for a solid-state lighting fixture according to one embodiment of the present disclosure.

FIG. 3 shows driver circuitry 54 for a solid-state lighting fixture according to one embodiment of the present disclosure. The driver circuitry includes rectifier circuitry 56, power factor correction (PFC) circuitry 58, and DC-DC converter circuitry 60. For context, a power supply 62, an electromagnetic interference (EMI) filter 64, control circuitry 66, and an LED light source 68 are also shown. The rectifier circuitry 56 is a bridge rectifier including a first rectifier input node 70A, a second rectifier input node 70B, a rectifier output node 72, a first rectifier diode $D_{R1}$, a second rectifier diode $D_{R2}$, a third rectifier diode $D_{R3}$, and a fourth rectifier diode $D_{R4}$. The first rectifier diode $D_{R1}$ includes an anode coupled to the first rectifier input node 70A and a cathode coupled to the rectifier output node 72. The second rectifier diode $D_{R2}$ includes an anode coupled to the second rectifier input node 70B and a cathode coupled to the rectifier output node 72. The third rectifier diode $D_{R3}$ includes an anode coupled to ground and a cathode coupled to the first rectifier input node 70A. The fourth rectifier diode $D_{R4}$ includes an anode coupled to ground and a cathode coupled to the second rectifier input node 70B. The first rectifier input node 70A is coupled to a positive output of the power supply 62, which is filtered via the EMI filter 64. The second rectifier input node 70B is coupled to a negative output of the power supply 62, which is also filtered via the EMI filter 64.

The PFC circuitry 58 is a boost converter including a boost input node 74, a boost output node 76, a boost inductor $L_B$, a boost switch $Q_B$, a boost diode $D_B$, and a boost capacitor $C_B$. The boost inductor $L_B$ is coupled between the boost input node 74 and an intermediary boost node 78. The boost switch $Q_B$ is coupled between the intermediary boost node 78 and ground. The boost diode $D_B$ is coupled between the intermediary boost node 78 and the boost output node 76. Finally, the boost capacitor $C_B$ is coupled between the boost output node 76 and ground. The boost input node 74 is coupled to the rectifier output node 72 of the rectifier circuitry 56.

The DC-DC converter circuitry 60 is a buck converter including a buck input node 80, a first buck output node 82A, a second buck output node 82B, a buck diode $D_{BK}$, a buck switch $Q_{BK}$, a buck inductor $L_{BK}$, and a buck capacitor $C_{BK}$. The buck diode $D_{BK}$ includes an anode coupled to an intermediate buck node 84 and a cathode coupled to the buck input node 80. The buck switch $Q_{BK}$ is coupled between the intermediate buck node 84 and ground. The buck inductor $L_{BK}$ is coupled between the intermediate buck node 84 and the second buck output node 82B. Finally, the buck capacitor $C_{BK}$ is coupled between the first buck output node 82A and the second buck output node 82B. The buck input node 80 is coupled to the boost output node 76 of the PFC circuitry 58, while the LED light source 68 is coupled in series across the first buck output node 82A and the second buck output node 82B, such that an anode of a first LED in the LED light source 68 is coupled to the first buck output node 82A, and a cathode of a second LED in the LED light source 68 is coupled to the second buck output node 82B. In some cases, an additional switch (not shown) may be coupled between the LED light source 68 and the second buck output node 82B, such that the additional switch is operated to pulse-width modulate the current through the LED light source 68 in order to generate a desired light output.

Although only a single string of series-connected LEDs are shown in the LED light source 68, any number of LEDs may be used for the LED light source and connected in various configurations without departing from the principles disclosed herein. For example, multiple strings of series-connected LEDs may be used for the LED light source 68 in some embodiments. In particular, the different strings of series-connected LEDs may each include LEDs configured to output a different wavelength of light, such that the light from each one of the strings of series-connected LEDs combine to generate light that is substantially white in color at a desired color temperature.

Notably, the switching devices in the PFC circuitry 58 and the DC-DC converter circuitry 60 are compound semiconductor devices. As defined herein, "switching devices" include diodes and other solid-state switching devices configured to selectively provide power to a load. Specifically, the boost switch $Q_B$, the boost diode $D_B$, the buck diode $D_{BK}$, and the buck switch $Q_{BK}$ may each be silicon carbide (SiC) devices. Using silicon carbide (SiC) switching devices in the PFC circuitry 58 and the DC-DC converter circuitry 60 results in substantial performance improvements in the driver circuitry 54 when compared to conventional solutions. In particular, as a result of the use of silicon carbide (SiC) switching components in the PFC circuitry 58 and the DC-DC converter circuitry 60, the driver circuitry 54 is able to maintain a high efficiency (e.g., greater than 90%) over a wide input voltage range (e.g., 185-528V) and further is able to maintain even higher efficiencies (e.g., greater than 94%) at one or more points in the input voltage range. Further, the driver circuitry 54 is able to sustain a total harmonic distortion (THD) less than about 20% and a power factor greater than about 0.9 for an input power equal to about 500 W. The use of silicon carbide (SiC) switching components in the PFC circuitry 58 and the DC-DC converter circuitry 60 additionally allows the PFC circuitry 58 to operate in a continuous conduction mode (CCM) and the DC-DC converter circuitry 60 to operate in a critical conduction or boundary mode of operation, each of which may further improve the performance of the driver circuitry 54 as discussed below.

In one embodiment, the boost diode $D_B$ and the buck diode $D_{BK}$ are silicon carbide (SiC) Schottky diodes. In other embodiments, the boost diode $D_B$ and the buck diode $D_{BK}$ may be any suitable diode element, for example, P-N diodes or PiN diodes. The boost switch $Q_B$ and the buck switch $Q_{BK}$ may be silicon carbide (SiC) metal-oxide-semiconductor field-effect transistors (MOSFETs). In other embodiments, the boost switch $Q_B$ and the buck switch $Q_{BK}$ may be any suitable switching element, such as field effect transistors (FETs), insulated gate bipolar transistors (IGBTs), high electron mobility transistors (HEMTs), bipolar junction transistors (BJTs), or the like.

In one embodiment, the switching devices in the PFC circuitry 58 and the DC-DC converter circuitry 60 are gallium nitride (GaN) devices. Specifically, the boost diode $D_B$ and the buck diode $D_{BK}$ may be gallium nitride (GaN) Schottky diodes. Further, the boost switch $Q_B$ and the buck switch $Q_{BK}$ may be gallium nitride (GaN) high electron mobility transistors (HEMTs). Using gallium nitride (GaN) devices may afford benefits similar to those discussed above with respect to silicon carbide.

In operation, an EMI-filtered AC input voltage from the power supply 62 is received at the rectifier circuitry 56, where it is rectified to generate a rectified voltage. The rectified voltage is then received by the PFC circuitry 58, which performs power factor correction and boosts the rectified voltage to generate a direct current (DC) PFC voltage. Specifically, a boost control signal provided to the boost switch $Q_B$ from PFC control circuitry 86 in the control circuitry 66 is modulated in order to charge the boost inductor $L_B$ (i.e., cause the boost inductor $L_B$ to store energy in the form of a magnetic field) while the boost switch $Q_B$ is ON (i.e. closed), and to discharge the boost inductor $L_B$ through the boost diode $D_B$ and across the boost capacitor $C_B$ when the boost switch $Q_B$ is OFF (i.e. open). The boost capacitor $C_B$ acts as a low-pass filter, providing a relatively constant DC output voltage (the PFC output voltage) to the DC-DC converter circuitry 60.

The particular modulation frequency and pattern of the boost control signal determines the amount of power factor correction and the magnitude of the resulting PFC output voltage generated by the PFC circuitry 58. In one embodiment, the boost control signal is modulated in relation to the AC input voltage from the power supply 62. That is, the boost control signal may be modulated based on the AC input voltage of the power supply 62 such that the PFC output voltage tracks the AC input voltage of the power supply 62. Operating the PFC circuitry 58 in this manner may lead to significant improvements in the efficiency of the PFC circuitry 58 over the input voltage range.

If the boost control signal is modulated such that the current through the boost inductor $L_B$ never falls to zero, the PFC circuitry 58 is said to operate in a continuous conduction mode (CCM). Operating the PFC circuitry 58 in a continuous conduction mode is desirable for high power applications, as it reduces the conduction loss of the boost inductor $L_B$ and the boost switch $Q_B$ used in the PFC circuitry 58 while maintaining a required or desired output voltage. However, operating the PFC circuitry 58 in a continuous conduction mode may require the boost control signal to be modulated at a significantly higher frequency than if the PFC circuitry 58 was operated in a discontinuous conduction mode. Accordingly, operating conventional driver circuitry in a continuous conduction mode is generally impractical or impossible due to the limitations on the switching speed of the silicon (Si) switching components therein, as discussed above. Because the driver circuitry 54 shown in FIG. 3 utilizes silicon carbide (SiC) switching components, the switching speed of the PFC circuitry 58 is not limited by the boost switch $Q_B$ or the boost diode $D_B$. The PFC circuitry 58 may therefore operate in a continuous conduction mode, which allows for a significant reduction in conduction power loss and possibly the size of the boost inductor $L_B$ and the driver circuitry 54 in general.

The DC-DC converter circuitry 60 receives the PFC voltage from the PFC circuitry 58 and regulates a driver output current, which is used to drive the LEDs of the LED light source 68. Specifically, a buck control signal provided to the buck switch $Q_{BK}$ from buck control circuitry 88 in the control circuitry 66 is modulated in order to charge the buck inductor $L_{BK}$ (i.e., cause the buck inductor $L_{BK}$ to store energy in the form of a magnetic field) while the buck switch $Q_{BK}$ is ON (i.e., closed), and to discharge the buck inductor $Q_{BK}$ and into the buck capacitor $C_{BK}$ when the buck switch $Q_{BK}$ is OFF (i.e., open). The buck capacitor $C_{BK}$ acts as a low-pass filter, providing a relatively constant DC output current (the driver output current) to the LED light source 68.

The particular modulation frequency and pattern of the buck control signal determines the magnitude of the resulting driver output current generated by the DC-DC converter circuitry 60. If the buck control signal is modulated such that the buck switch $Q_{BK}$ is turned ON each time the current through the buck inductor $L_{BK}$ decreases to zero the DC-DC converter circuitry 60 is said to operate in a critical conduction or boundary mode of operation. Operating in a critical conduction or boundary mode of operation is desirable because the buck switch $Q_{BK}$ is turned ON when the voltage across the switch resonates to a valley, which results in lower switching loss and reverse recovery loss of the buck diode $D_{BK}$. However, similar to the principles discussed above with respect to the PFC circuitry 58 operating a continuous conduction mode, operating the DC-DC converter circuitry 60 in a critical conduction or boundary mode may require the buck control signal to be modulated at a significantly higher frequency than if the DC-DC converter circuitry 60 was operated in a discontinuous conduction mode. Because the driver circuitry 54 shown in FIG. 3 utilizes silicon carbide (SiC) switching components, the switching speed of the DC-DC converter circuitry 60 is not limited by the buck switch $Q_{BK}$ or the buck diode $D_{BK}$. The DC-DC converter circuitry 60 may therefore operate in a critical conduction or boundary mode, which reduces the switching losses experienced by the DC-DC converter circuitry 60 and increases the performance of the driver circuitry 54.

One issue experienced by operating the DC-DC converter circuitry 60 in a critical conduction or boundary mode is that the switching frequency of the buck switch $Q_{BK}$ varies as a function of the voltage across and current through the LED light source 68, as well as the inductance of the buck inductor $L_{BK}$, and the output PFC voltage, as shown by Equation 1 below:

$$f_s = \frac{V_{LED}}{2I_{LED}L_{BK}}\left(1 - \frac{V_{LED}}{V_B}\right) \quad (1)$$

where $V_{LED}$ is the voltage across the LED light source 68, $I_{LED}$ is the current through the LED light source 68, $L_{BK}$ represents the inductance of the buck inductor $L_{BK}$, and $V_B$ is the PFC output voltage. Assuming $V_{LED}$=300V, $V_B$=800V, and $L_{BK}$=1 mH, the switching frequency of the DC-DC converter circuitry 60 increases by a factor of 10 from 89 kHz to 890 kHz when the current through the LED light source $I_{LED}$ is reduced from 1.05 A to 0.105 A. An extremely high switching frequency (e.g., 890 kHz) will generally exceed the frequency limit of the buck control circuitry 88, and further may also cause high switching loss even for the silicon carbide (SiC) buck switch $Q_{BK}$. This switching loss is exacerbated when the PFC output voltage $V_B$ is high and the voltage $V_{LED}$ across the LED light source 68 is low, since the voltage across the buck switch $Q_{BK}$ is approximately equal to $V_B$–2$V_{LED}$ at the moment the buck switch $Q_{BK}$ is turned ON. Accordingly, the switching frequency $f_s$ of the buck switch $Q_{BK}$ should be limited to a practical value in some applications (e.g., below 500 kHz).

Figure 4:
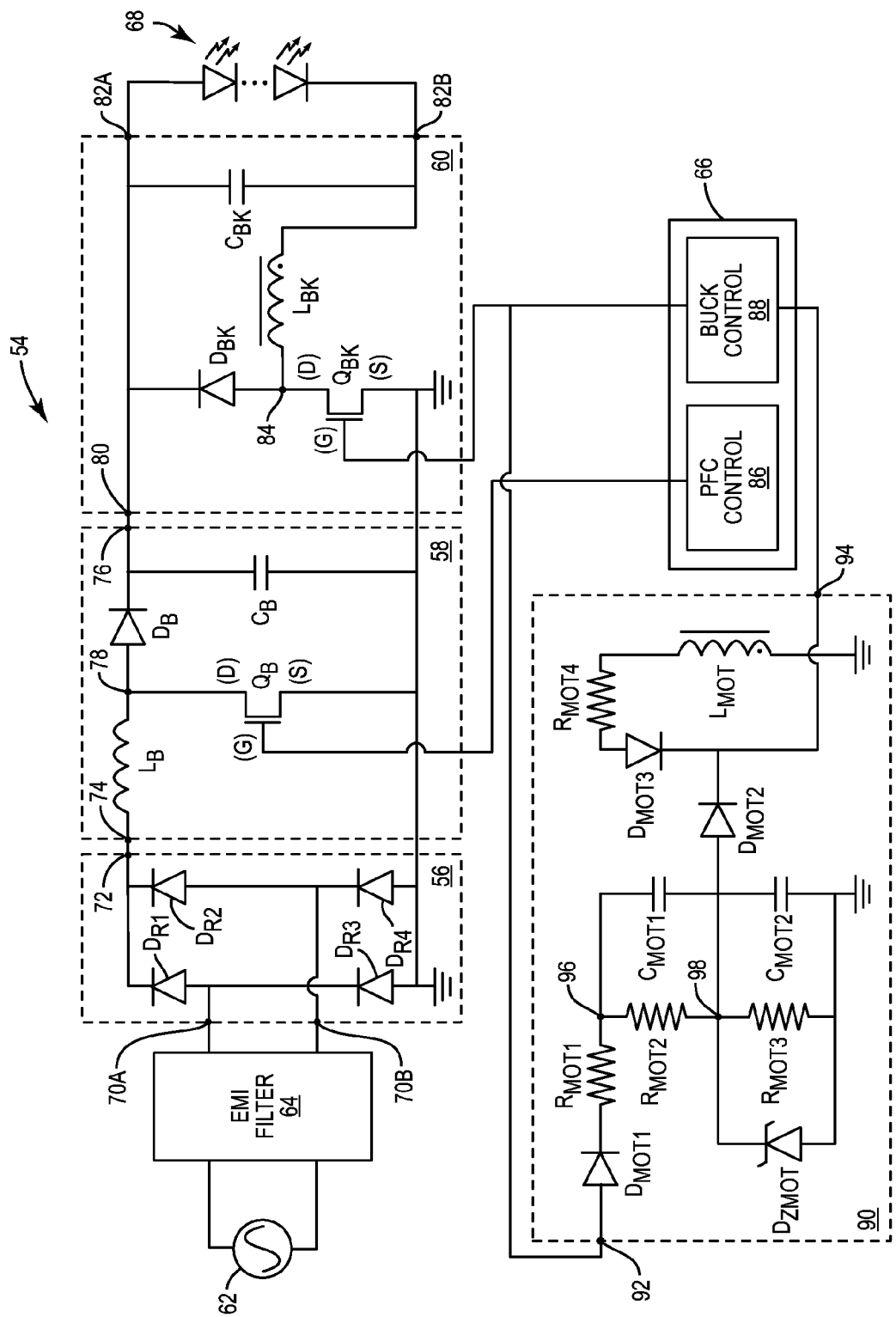
FIG. 4 is a schematic representation of the driver circuitry and minimum off-time circuitry according to one embodiment of the present disclosure.

FIG. 4 therefore shows the driver circuitry 54 and minimum off time (MOT) circuitry 90 according to one embodiment of the present disclosure. The MOT circuitry 90 is coupled to the buck control circuitry 88 in the control circuitry 66, and is configured to ensure that the buck switch $Q_{BK}$ remains OFF for a minimum amount of time between switching cycles of the buck switch $Q_{BK}$ in order to prevent excessive switching loss in the DC-DC converter circuitry 60. In one embodiment, the minimum off time is set to 2.5 μs, thereby limiting the maximum switching frequency to <~400 kHz (taking into account the turn-on time of the circuitry).

The MOT circuitry 90 includes a MOT input node 92, a MOT output node 94, three MOT diodes $D_{MOT1}$-$D_{MOT3}$, a MOT zener diode $D_{ZMOT}$, four MOT resistors $R_{MOT1}$-$R_{MOT4}$, two MOT capacitors $C_{MOT1}$ and $C_{MOT2}$, and an MOT inductor $L_{MOT}$. Notably, the MOT inductor $L_{MOT}$ is an auxiliary winding of the buck inductor $L_{BK}$, such that the MOT inductor $L_{MOT}$ and the buck inductor $L_{BK}$ are electromagnetically coupled. A first MOT diode $D_{MOT1}$ is coupled in series with a first MOT resistor $R_{MOT1}$ between the MOT input node 92 and a first MOT intermediate node 96, such that the first MOT diode $D_{MOT1}$ includes an anode coupled to the MOT input node 92 and a cathode coupled to a first MOT resistor $R_{MOT1}$. A first MOT capacitor $C_{MOT1}$ and a second MOT resistor $R_{MOT2}$ are coupled in parallel between the first MOT intermediate node 96 and a second MOT intermediary node 98. A second MOT diode $D_{MOT2}$, a third MOT resistor $R_{MOT3}$, and a second MOT capacitor $C_{MOT2}$ are coupled in parallel between the second MOT intermediary node 98 and ground, such that an anode of the second MOT diode $D_{MOT2}$ is coupled to ground and a cathode of the second MOT intermediary node 98 is coupled to the second MOT intermediary node 98. A third MOT diode $D_{MOT3}$ is coupled between the second MOT intermediary node 98 and the MOT output node 94, such that an anode of the third MOT diode $D_{MOT3}$ is coupled to the second MOT intermediary node 98 and a cathode of the third MOT diode $D_{MOT3}$ is coupled to the MOT output node 94. Finally, the MOT zener diode $D_{ZMOT}$, a fourth MOT resistor $R_{MOT4}$, and the MOT inductor $L_{MOT}$ are coupled in series between the MOT output node 94 and ground, such that a cathode of the MOT zener diode $D_{ZMOT}$ is coupled to the MOT output node 94 and an anode of the MOT zener diode $D_{ZMOT}$ is coupled to the fourth MOT resistor $R_{MOT4}$, which is in turn coupled to ground through the MOT inductor $L_{MOT}$. The MOT input node 92 is configured to receive the buck control signal from the buck control circuitry 88. The MOT output node 94 is coupled to an input of the buck control circuitry 88.

In operation, the buck control signal is received at the MOT input node 92. When the buck control signal is high (i.e., when the buck switch $Q_{BK}$ is turned ON), the second MOT capacitor $C_{MOT2}$ is charged through the first MOT capacitor $C_{MOT1}$ and the second MOT resistor $R_{MOT2}$. Further, the MOT inductor $L_{MOT}$ will begin to store energy coupled from the buck inductor $L_{BK}$, and current will flow from the MOT inductor $L_{MOT}$ through the fourth MOT resistor $R_{MOT4}$ and the third MOT diode $D_{MOT1}$. The MOT zener diode $D_{ZMOT}$ is used to clamp the voltage at the MOT output node 94. The first MOT resistor $R_{MOT1}$ is used to limit the peak charging current delivered to the second MOT capacitor $C_{MOT2}$ and to protect the first MOT diode $D_{MOT1}$ as well as the MOT zener diode $D_{ZMOT}$. When the buck control signal is low (i.e., when the buck switch $Q_{BK}$ is turned OFF), the voltage across the second MOT capacitor $C_{MOT2}$ begins to decay. Further, the voltage across the MOT inductor $L_{MOT}$ also begins to decay. When both the voltage across the second MOT capacitor $C_{MOT2}$ and the voltage across the MOT inductor $L_{MOT}$ drop to zero, the voltage at the MOT output node 94 will similarly drop to zero. In response to the voltage at the MOT output node 94 dropping to zero, the buck control circuitry 88 will start the cycle again, turning ON the buck switch $Q_{BK}$. In other words, the buck control circuitry 88 will not turn the buck switch $Q_{BK}$ back ON until the voltage at the MOT output node 94 drops to zero. The time for the voltage at the MOT output node 94 to drop to zero therefore determines the minimum off time of the buck switch $Q_{BK}$. Accordingly, the minimum off time of the buck switch $Q_{BK}$ may be limited in order to prevent switching losses from high switching frequencies in the DC-DC converter circuitry 60.

Figure 5:
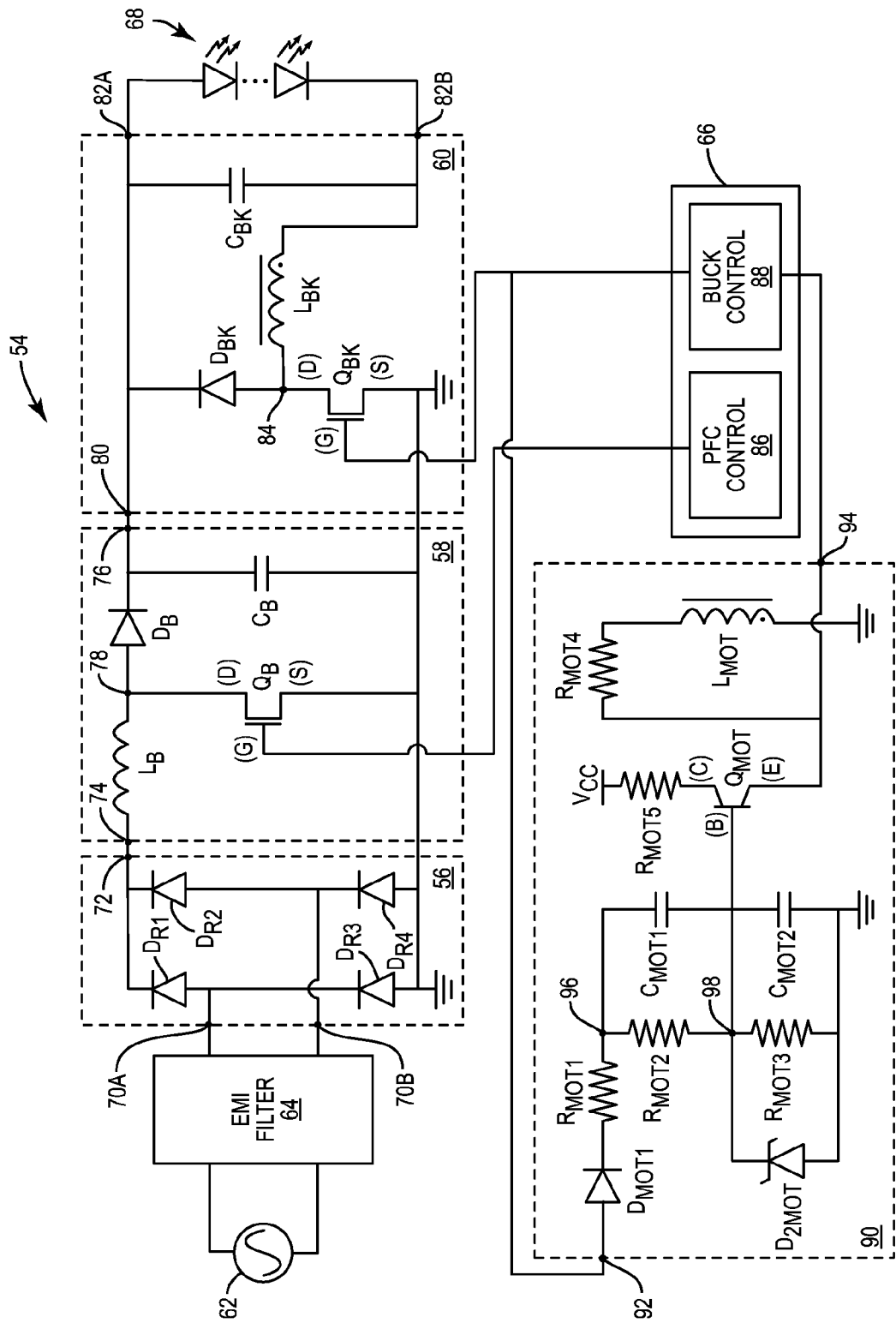
FIG. 5 is a schematic representation of the driver circuitry and the minimum off-time circuitry according to an additional embodiment of the present disclosure.

FIG. 5 shows the driver circuitry 54 and the MOT circuitry 90 according to an additional embodiment of the present disclosure. The MOT circuitry 90 shown in FIG. 5 is substantially similar to that shown in FIG. 4, except that the second MOT diode $D_{MOT2}$ and the third MOT diode $D_{MOT3}$ are replaced with a MOT transistor $Q_{MOT}$ and a fifth MOT resistor $R_{MOT5}$. The MOT transistor $Q_{MOT}$ includes a base contact (B) coupled to the second MOT intermediary node 98, a collector contact (C) coupled to the MOT output node 94, and an emitter contact (E) coupled to a supply voltage ($V_{cc}$) through the fifth MOT resistor $R_{MOT5}$.

In operation, the buck control signal is received at the MOT input node 92. When the buck control signal is high (i.e., when the buck switch $Q_{BK}$ is turned ON), the second MOT capacitor $C_{MOT2}$ is charged through the first MOT capacitor $C_{MOT1}$ and the second MOT resistor $R_{MOT2}$, thereby placing a charge at the gate contact (G) of the MOT transistor $Q_{MOT}$. Further, the MOT inductor $L_{MOT}$ will begin to store energy coupled from the buck inductor $L_{BK}$, and current will flow from the MOT inductor $L_{MOT}$ through the fourth MOT resistor $R_{MOT4}$. If the voltage across the MOT inductor $L_{MOT}$ is greater than the charge across the second MOT capacitor $C_{MOT2}$, the MOT transistor $Q_{MOT}$ will remain OFF, and the voltage across the MOT inductor $L_{MOT}$ will hold the MOT output node 94 high. If the voltage across the MOT inductor $L_{MOT}$ is less than the voltage across the second MOT capacitor $C_{MOT2}$, the MOT transistor $Q_{MOT}$ will turn ON and provide a voltage suitable to continue to hold the MOT output node 94 high. When the buck control signal is low (i.e., when the buck switch $Q_{BK}$ is turned OFF), the voltage across the second MOT capacitor $C_{MOT2}$ begins to decay. Further, the voltage across the MOT inductor $L_{MOT}$ also begins to decay. Since either the voltage across the second MOT capacitor $C_{MOT2}$ or the voltage across the MOT inductor $L_{MOT}$ are suitable to hold the MOT output node 94 high, both of the voltages must drop to zero before the MOT output node 94 will similarly drop to zero. As discussed above, the buck control circuitry 88 will not turn the buck switch $Q_{BK}$ back ON until the voltage at the MOT output node 94 drops to zero. Accordingly, the minimum off time of the buck switch $Q_{BK}$ may be limited in order to prevent switching losses from high switching frequencies in the DC-DC converter circuitry 60.

Figure 6:
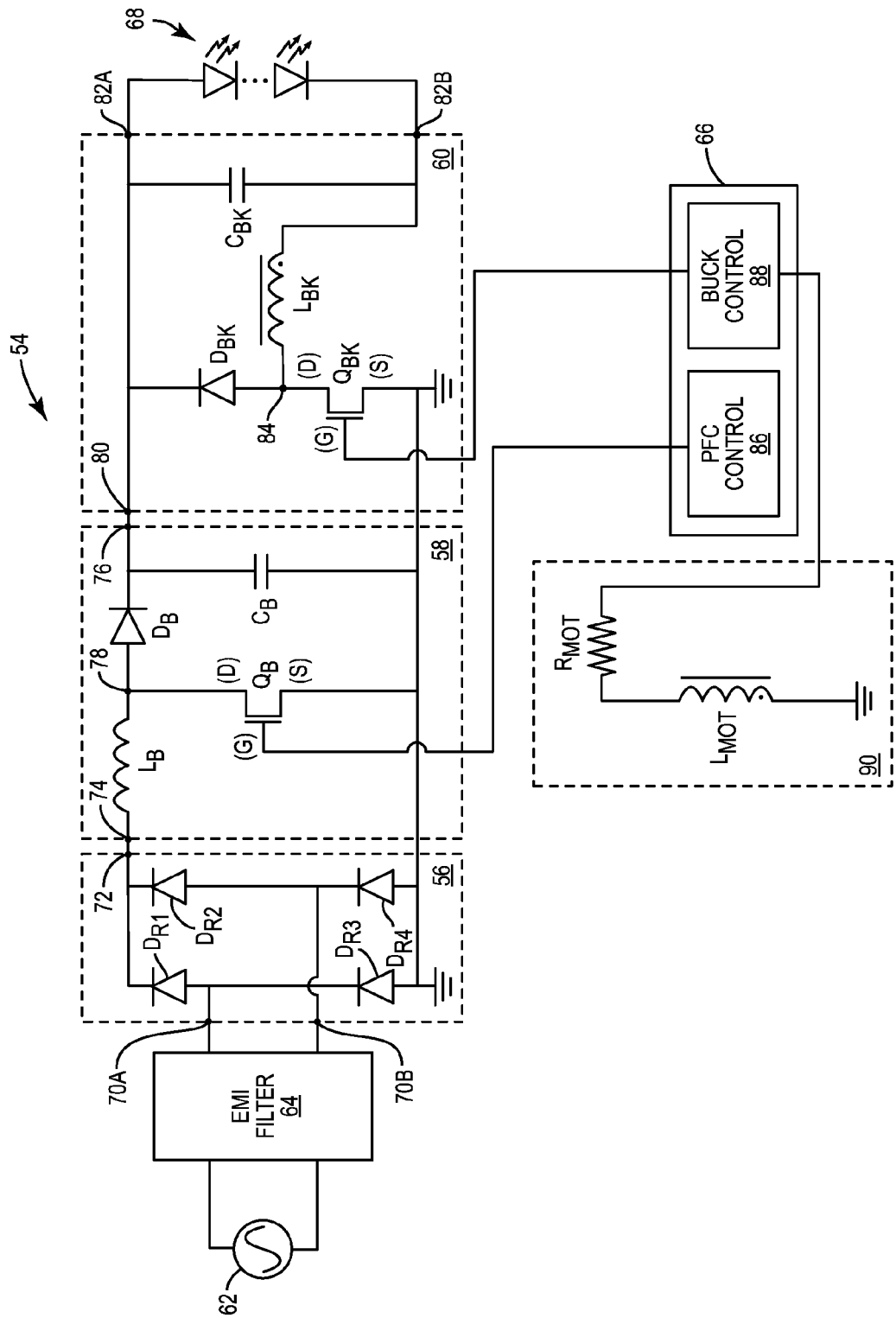
FIG. 6 is a schematic representation of the driver circuitry and the minimum off-time circuitry according to an additional embodiment of the present disclosure.

FIG. 6 shows the driver circuitry 54 and the MOT circuitry 90 according to an additional embodiment of the present disclosure. The MOT circuitry 90 includes a MOT inductor $L_{MOT}$, and a MOT resistor $R_{MOT}$. Notably, the buck control circuitry 88, which may be a microcontroller, is configured to limit the OFF time of the buck switch $Q_{BK}$ based on feedback provided by the MOT circuitry 90 as well as additional measurements in this embodiment. The MOT inductor $L_{MOT}$ and the MOT resistor $R_{MOT}$ are coupled in series between an input of the buck control circuitry 88 and ground. Similar to the embodiments discussed above, the MOT inductor $L_{MOT}$ is an auxiliary winding of the buck inductor $L_{BK}$, such that the MOT inductor $L_{MOT}$ and the buck inductor $L_{BK}$ are electromagnetically coupled. The buck control circuitry 88 may have further inputs to receive the current $I_{LED}$ through the LED light source 68, the current $I_{QBK}$ through the buck switch $Q_{BK}$, and a dimming control signal DIM indicating a desired level of light output from the LED light source 68. At full load (i.e., when the dimming control signal DIM indicates that the LED light source 68 is to be driven at full intensity), the buck control circuitry 88 monitors the voltage across the MOT inductor $L_{MOT}$ and turns the buck switch $Q_{BK}$ ON only after the voltage across the MOT inductor $L_{MOT}$ has fallen to zero. When the current $I_{LED}$ through the LED light source 68 is reduced (i.e., when the dimming control signal DIM indicates that the LED light source 68 should be driven below full intensity), the switching frequency of the DC-DC converter circuitry 60 begins to increase. Accordingly, the buck control circuitry 88 increases the time that the buck switch $Q_{BK}$ remains OFF between switching cycles proportionally with the amount of dimming, thereby reducing the switching losses of the DC-DC converter circuitry 60.

Figure 7:
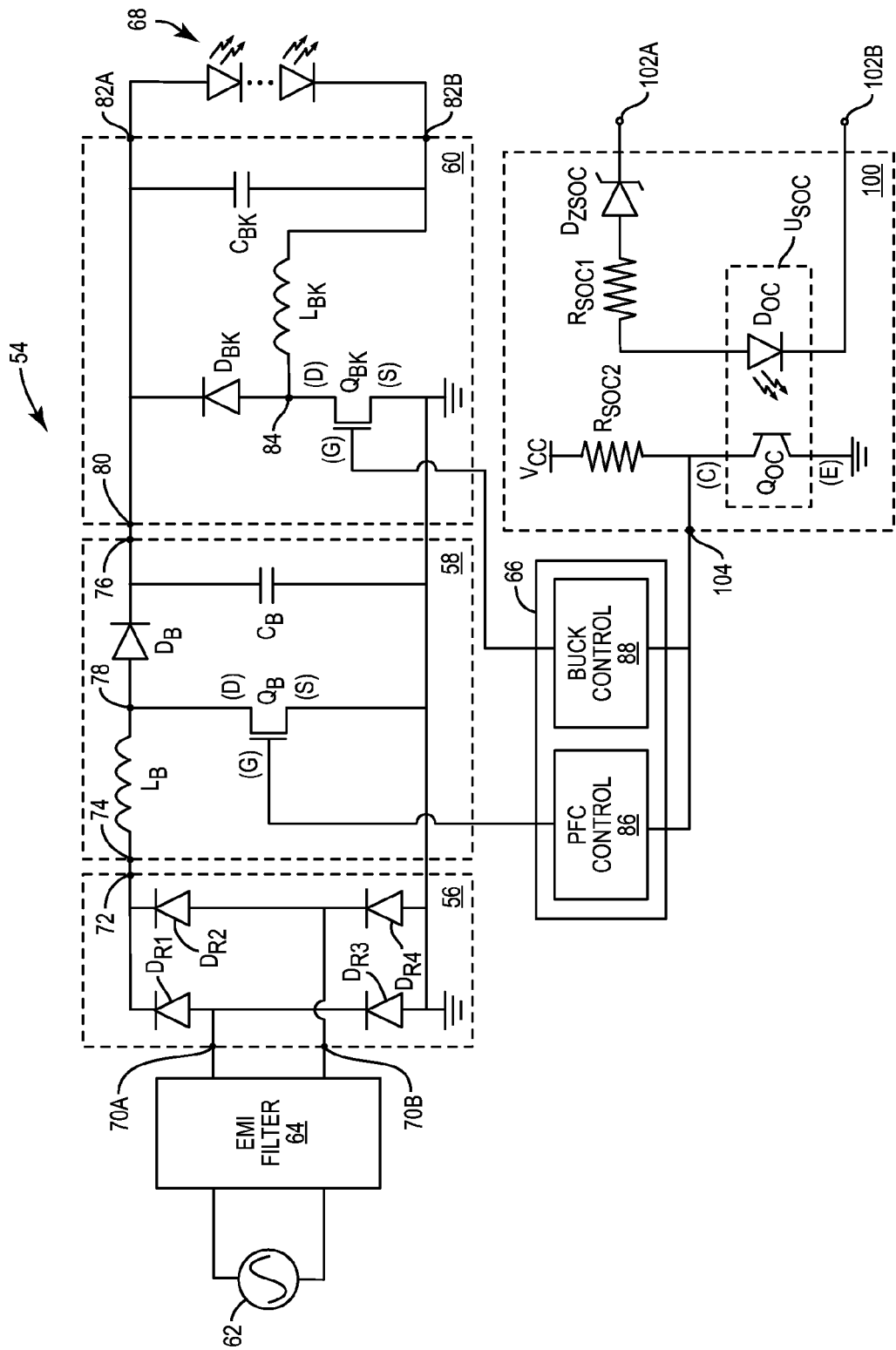
FIG. 7 is a schematic representation of the driver circuitry and isolated shut-off control circuitry according to one embodiment of the present disclosure.

FIG. 7 shows the driver circuitry 54 and isolated shut-off control (SOC) circuitry 100 according to one embodiment of the present disclosure. The isolated SOC circuitry 100 may supply a signal to the PFC control circuitry 86 and/or the buck control circuitry 88 in order to instruct the PFC control circuitry 86 and/or the buck control circuitry 88 to turn OFF. The isolated SOC circuitry 100 may include a first SOC input node 102A, a second SOC input node 102B, an SOC output node 104, an SOC zener diode $D_{ZSOC}$, an SOC optocoupler $U_{SOC}$, a first SOC resistor $R_{SOC1}$, and a second SOC resistor $R_{SOC2}$. The SOC optocoupler $U_{SOC}$ may include an optocoupler LED $D_{OC}$ and an optocoupler photosensitive transistor $Q_{OC}$. The SOC zener diode $D_{ZSOC}$, the first SOC resistor $R_{SOC1}$, and the optocoupler LED $D_{OC}$ may be coupled in series between the first SOC input node 102A and the second SOC input node 102B, such that the first SOC resistor $R_{SOC1}$ is coupled between the anodes of the SOC zener diode $D_{ZSOC}$ and the optocoupler LED $D_{OC}$, a cathode of the SOC zener diode $D_{ZSOC}$ is coupled to the first SOC input node 102A, and a cathode of the optocoupler LED $D_{OC}$ is coupled to the second SOC input node 102B. The optocoupler photosensitive transistor $Q_{OC}$ includes a collector contact (C) coupled to the SOC output node 104 and an emitter contact (E) coupled to ground. Finally, the second SOC resistor $R_{SOC2}$ is coupled between a supply voltage $V_{CC}$ and the SOC output node 104.

In operation, when an external control voltage, which may be supplied, for example, by a light switch or a dimming triac, applied across the first SOC input node 102A and the second SOC input node 102B is higher than the zener voltage of the SOC zener diode $D_{ZSOC}$, the SOC zener diode $D_{ZSOC}$ begins to conduct, sending a current through the optocoupler LED $D_{OC}$, thereby turning on the optocoupler photosensitive transistor $Q_{OC}$ and pulling the SOC output node 104 to ground. In this embodiment, when the PFC control circuitry 86 and the buck control circuitry 88 receive a high signal at the SOC output node 104, the PFC circuitry 58 and the DC-DC converter circuitry 60 are left ON. However, the PFC circuitry 58 and the DC-DC converter circuitry 60 are disabled when a low signal (e.g., ground) is placed at the SOC output node 104. Using the SOC optocoupler $U_{SOC}$ allows the PFC control circuitry 86 and the buck control circuitry 88 to remain isolated from the control signals used to turn the PFC circuitry 58 and the DC-DC converter circuitry 60 OFF. Accordingly, noise may be reduced in the driver circuitry 54.

Figure 8:
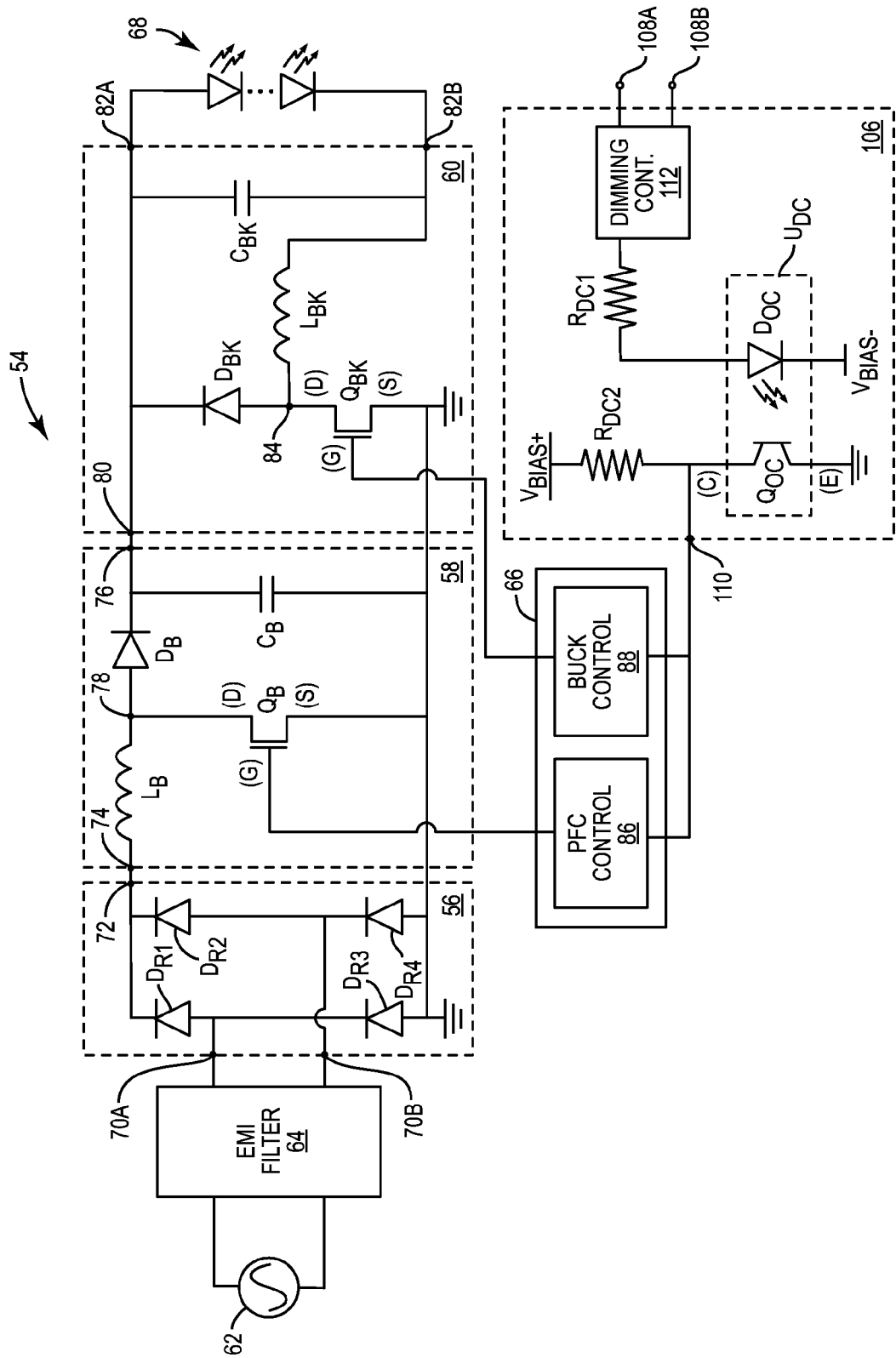
FIG. 8 is a schematic representation of the driver circuitry and isolated dimming control circuitry according to one embodiment of the present disclosure.

FIG. 8 shows the driver circuitry 54 and isolated dimming control circuitry 106 according to one embodiment of the present disclosure. The dimming control circuitry 106 may include a first dimming control input node 108A, a second dimming control input node 108B, a dimming control output node 110, a dimming control microcontroller 112, a first dimming control resistor $R_{DC1}$, a second dimming control resistor $R_{DC2}$, and a dimming control optocoupler $U_{DC}$. The dimming control optocoupler $U_{DC}$ may include an optocoupler LED $D_{OC}$ and an optocoupler photosensitive transistor $Q_{OC}$. The dimming control microcontroller 112 may be coupled to the first dimming control input node 108A and the second dimming control input node 108B. The first dimming control resistor $R_{DC1}$ and the optocoupler LED $D_{OC}$ may be coupled between the an input of the dimming control microcontroller 112 and a negative bias voltage ($V_{BIAS-}$), such that an anode of the optocoupler LED $D_{OC}$ is coupled to the first dimming control resistor $R_{DC1}$, which is in turn coupled to the input of the dimming control microcontroller 112, and a cathode of the optocoupler LED $D_{OC}$ is coupled to the negative bias voltage ($V_{BIAS-}$). The optocoupler photosensitive diode $Q_{OC}$ may include a collector contact (C) coupled to the dimming control output node 110 and an emitter contact (E) coupled to ground. Finally, the second dimming control resistor $R_{DC2}$ may be coupled between a positive bias voltage ($V_{BIAS+}$) and the dimming control output node 110.

In operation, the dimming control microcontroller 112 receives an external control voltage applied across the first dimming control input node 108A and the second dimming control input node 108B, for example, from a dimming triac or other dimming control interface. The dimming control microcontroller 112 then generates a pulse-width modulated (PWM) dimming control signal with a duty cycle proportional to the control voltage across the first dimming control resistor $R_{DC1}$ and the optocoupler LED $D_{OC}$. The PWM dimming control signal activates the optocoupler photosensitive transistor $Q_{OC}$, which results in the PWM dimming control signal being placed at the dimming control output node 110. In one embodiment, the dimming control circuitry 106 monitors one or more voltages or currents in the driver circuitry 54 and uses the measurements as feedback for adjusting the PWM dimming control signal. In response to the PWM dimming control signal, the PFC control circuitry 86 and the buck control circuitry 88 supply the LED light source 68 with a voltage and/or current that is proportional to the duty cycle of the PWM dimming control signal. Accordingly, the dimming control microcontroller 112 may maintain a desired amount of light output from the LED light source 68. The PWM dimming control signal may be delivered to the PFC control circuitry 86, the buck control circuitry 88, or both, where it may be used to modulate the PFC control signal and/or the buck control signal, respectively in order to control the voltage across the LED light source 68 and/or the current through the LED light source 68.

Figure 9:
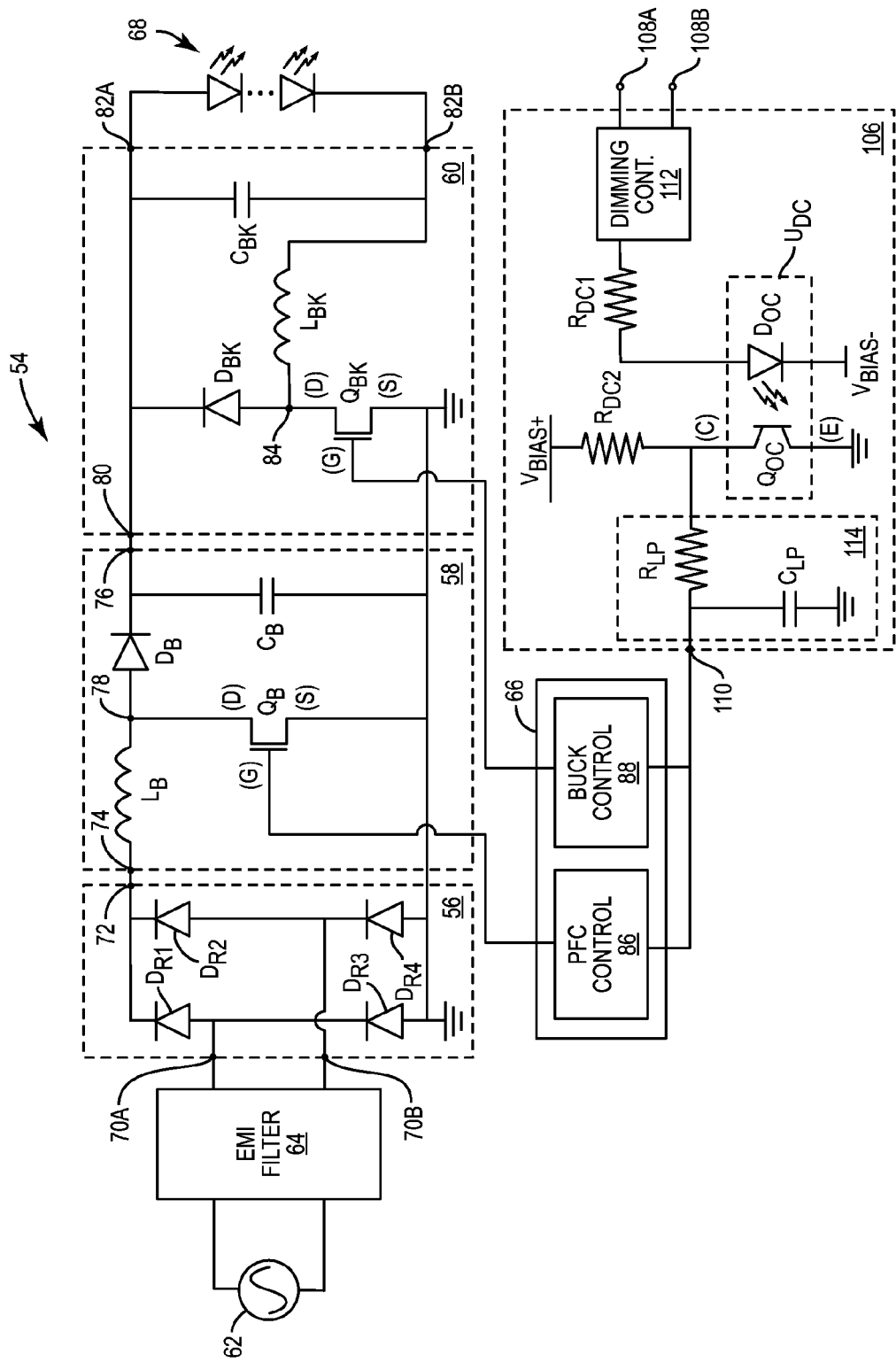
FIG. 9 is a schematic representation of the driver circuitry and the isolated dimming control circuitry according to an additional embodiment of the present disclosure.

FIG. 9 shows the driver circuitry 54 and the isolated dimming control circuitry 106 according to an additional embodiment of the present disclosure. The dimming control circuitry 106 shown in FIG. 9 is substantially similar to that shown in FIG. 8, but further includes a low-pass filter 114 coupled to the dimming control output node 110. The low-pass filter 114 includes a low-pass resistor $R_{LP}$ and a low-pass capacitor $C_{LP}$, which average the PWM dimming control signal into a linear dimming control signal. The linear dimming control signal may be delivered to the PFC control circuitry 86, the buck control circuitry 88, or both, where it may be used to modulate the PFC control signal and/or the buck control signal, respectively in order to control the voltage across the LED light source 68 and the current through the LED light source 68.

Figure 10:
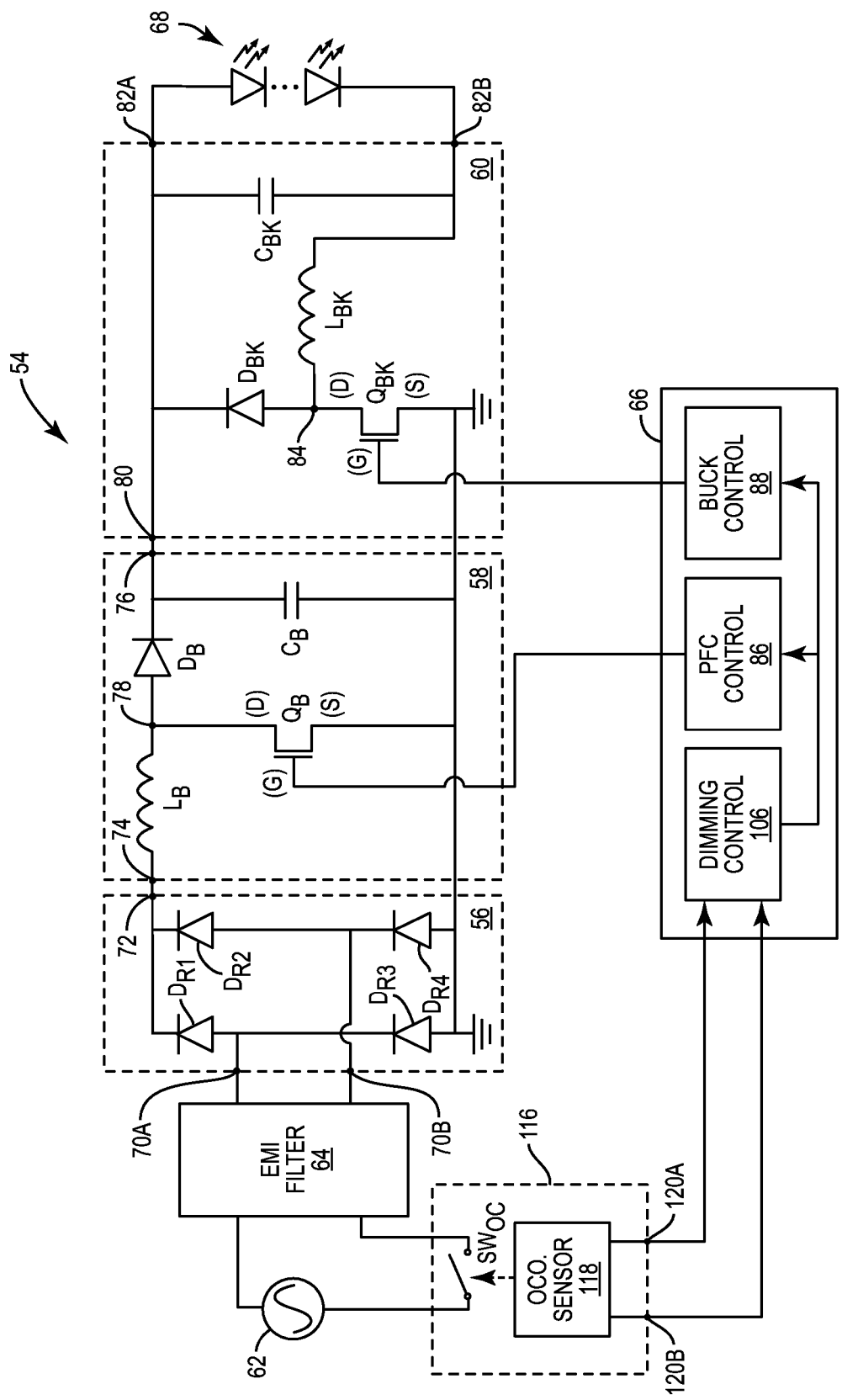
FIG. 10 is a schematic representation of the driver circuitry and occupancy control circuitry according to one embodiment of the present disclosure.
Figure 11:
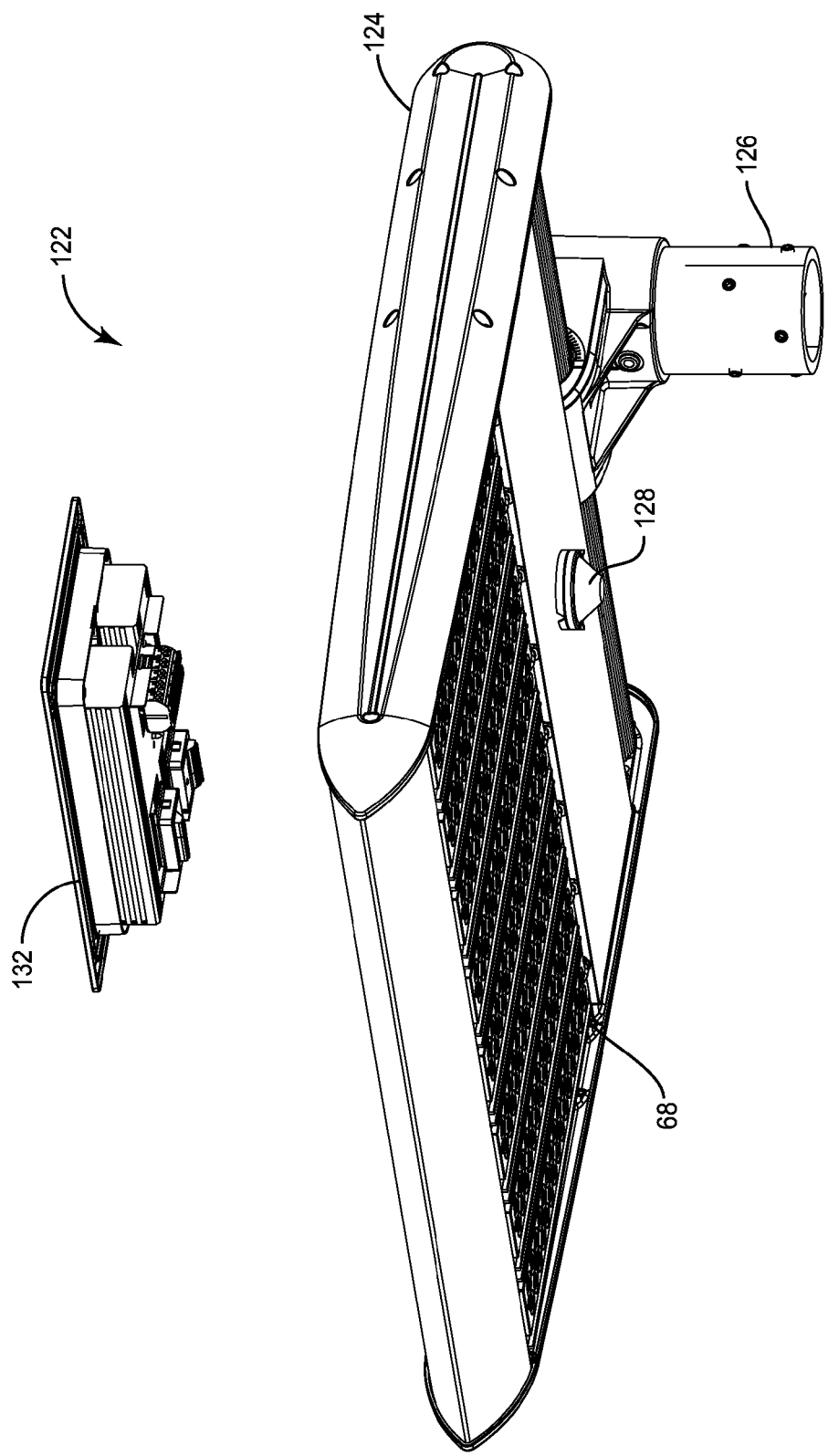
FIG. 11 is an isometric view of a lighting fixture including a driver circuitry module according to one embodiment of the present disclosure.
Figure 12:
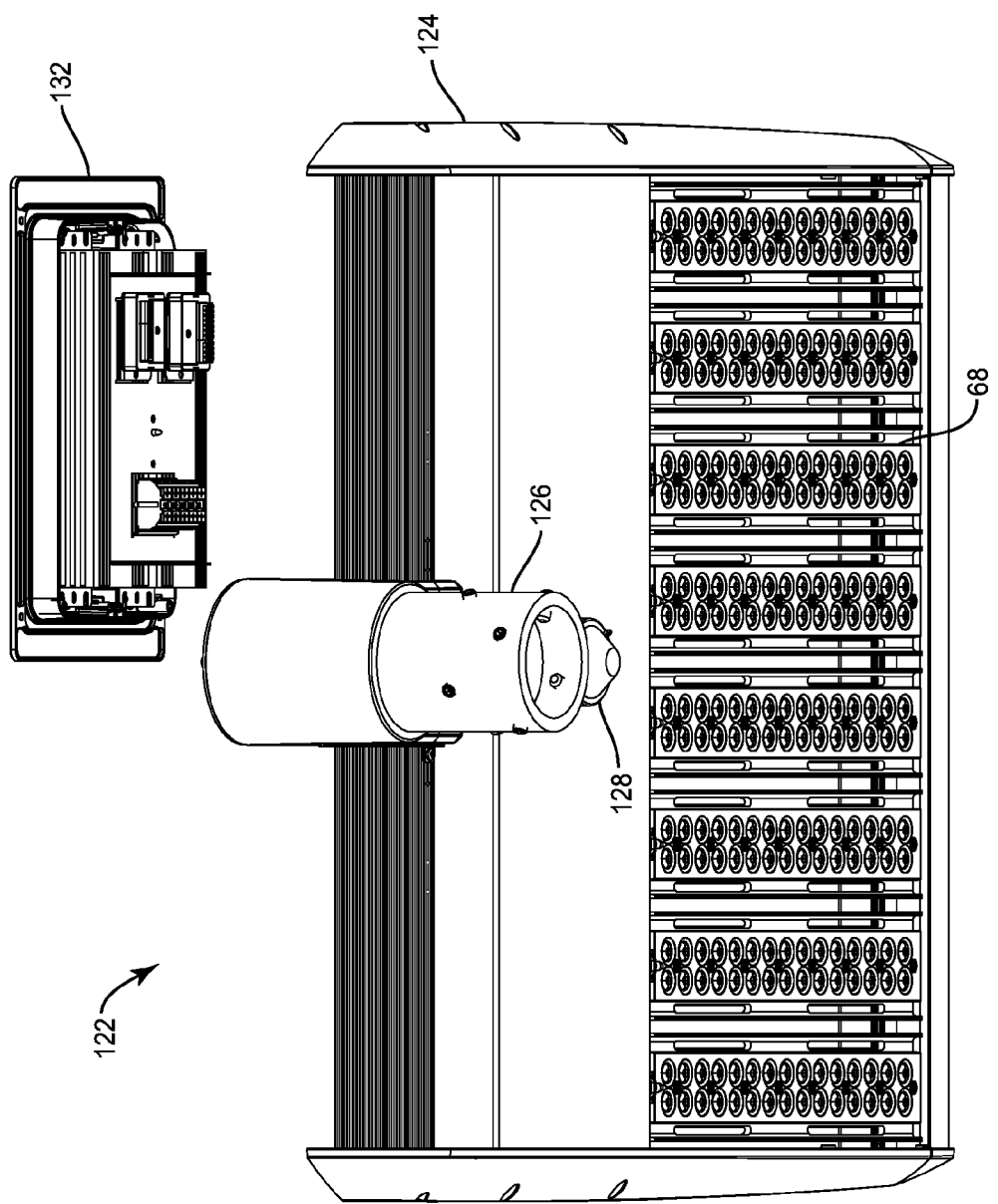
FIG. 12 is a bottom perspective view of the lighting fixture and the driver circuitry module according to one embodiment of the present disclosure.
Figure 13:
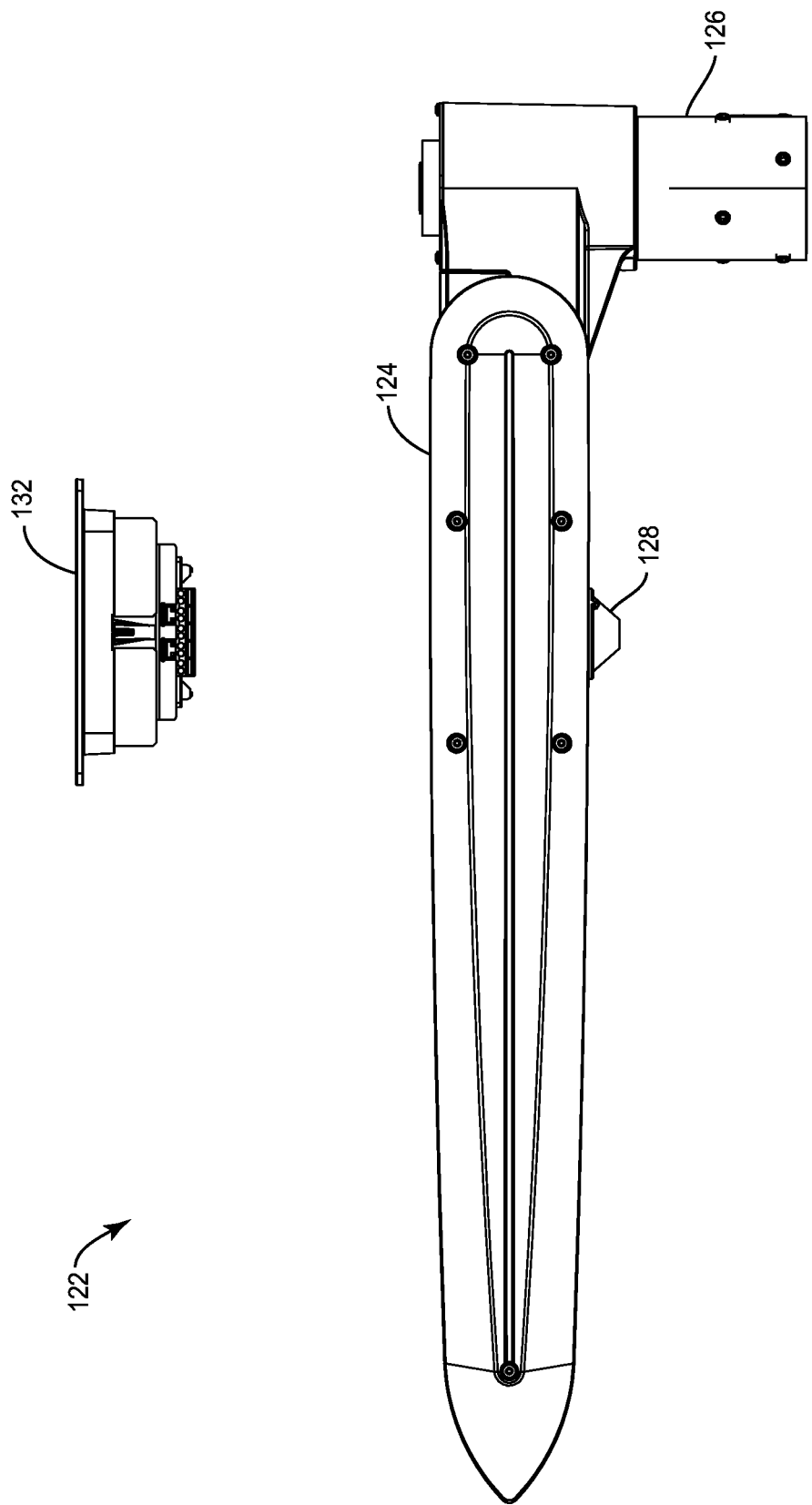
FIG. 13 is a side perspective view of the lighting fixture and the driver circuitry module according to one embodiment of the present disclosure.
Figure 14:
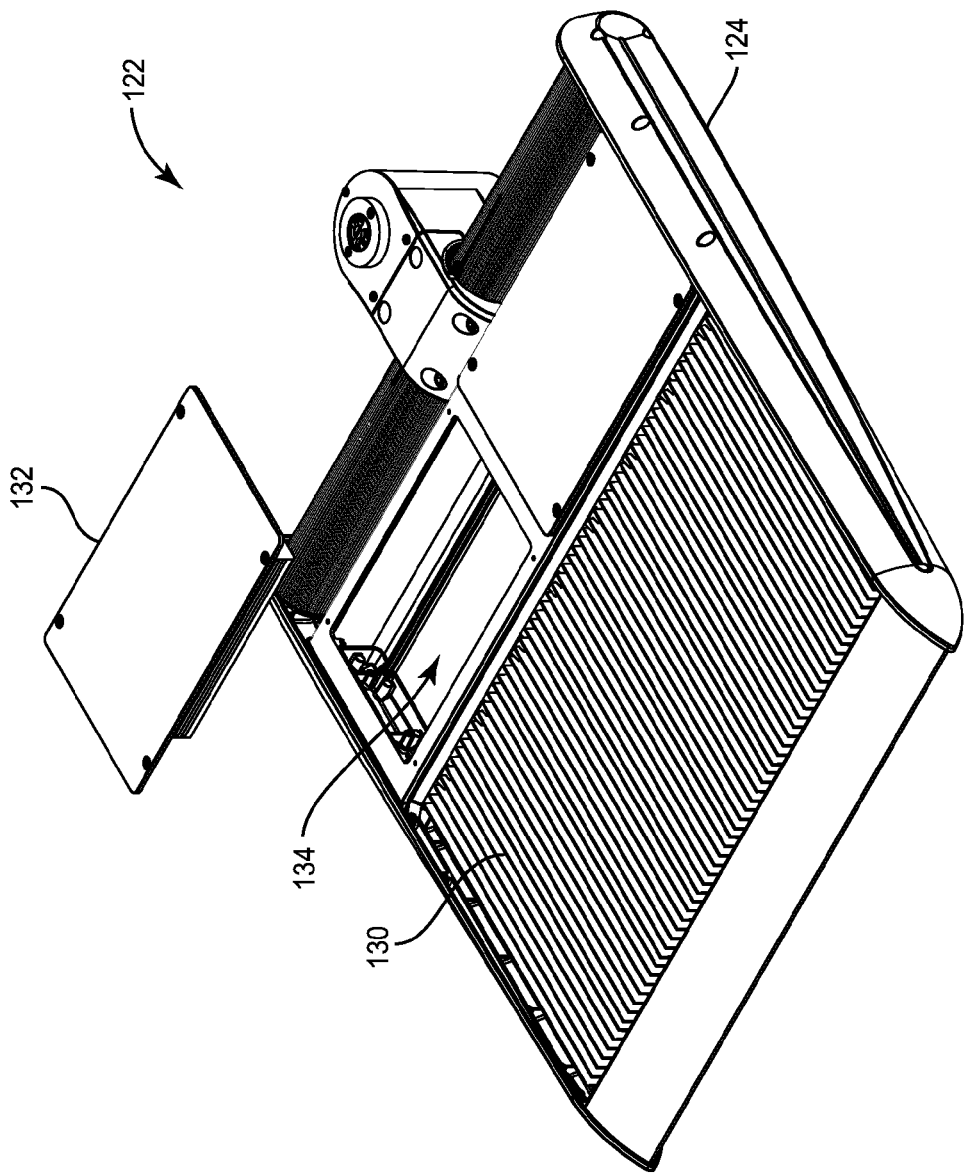
FIG. 14 is a top-isometric view of the lighting fixture and the driver circuitry module according to one embodiment of the present disclosure.

FIG. 10 shows the driver circuitry 54 and an occupancy control module 116 according to one embodiment of the present disclosure. The occupancy control module 116 includes an occupancy control switch $SW_{OC}$ and an occupancy control sensor 118. The occupancy control switch $SW_{OC}$ may be coupled between the negative output of the power supply 62 and the EMI filter 64. Further, the occupancy control module 116 may be coupled to the dimming control circuitry 106 via a first control voltage output node 120A and a second control voltage output node 120B. The occupancy control sensor 118 may detect the presence or absence of people in a given area. In response to a lack of people in the area detected by the occupancy control sensor 118, the occupancy control sensor 118 may open the occupancy control switch $SW_{OC}$, thereby cutting power to the driver circuitry 54 and thus the LED light source 68. Alternatively, the occupancy control sensor 118 may send a control voltage to the dimming control circuitry 106 instructing the dimming control circuitry 106 to dim the LED light source 68 to a predetermined level. Accordingly, the LED light source 68 may only provide light output when a person is physically in the vicinity of the light source, thereby saving energy.

FIGS. 11 through 14 show an exemplary lighting fixture 122 incorporating the driver circuitry 54 according to one embodiment of the present disclosure. The lighting fixture 122 includes an outer housing 124, a mounting apparatus 126, an occupancy module housing 128, and a heatsink 130. The driver circuitry 54 is located within a driver circuitry module 132, which is inserted into a top cavity 134 located in the top of the outer housing 124 of the lighting fixture 122. Notably, the driver circuitry 54 described herein may be retro-fitted into a pre-existing lighting fixture 122, such as the Edge High Output series lighting fixtures manufactured by Cree, Inc. of Durham, N.C. The outer housing 124 of the lighting fixture 122 may include more than one top cavity 134 in order to accept a number of driver circuitry modules 132. However, since the driver circuitry 54 discussed above utilizes silicon carbide (SiC) switching components, the power handling capability of multiple driver circuitry modules 132 may be accomplished by a single driver circuitry module 132, thereby saving not only space in the lighting fixture 122, but also expense. In many applications, the added expense of the silicon carbide (SiC) switching components utilized in the driver circuitry 54 is more than compensated for by the reduction in the overall number of components in the driver circuitry module 132. The occupancy module housing 128 may be mounted on a bottom surface of the lighting fixture 122 alongside the LED light source 68. The LED light source 68 may be mounted such that the LEDs are thermally coupled to the heatsink 130, which may include a plurality of fins configured to disperse heat away from the LED light source 68 towards the top of the lighting fixture 122.

Figure 15:
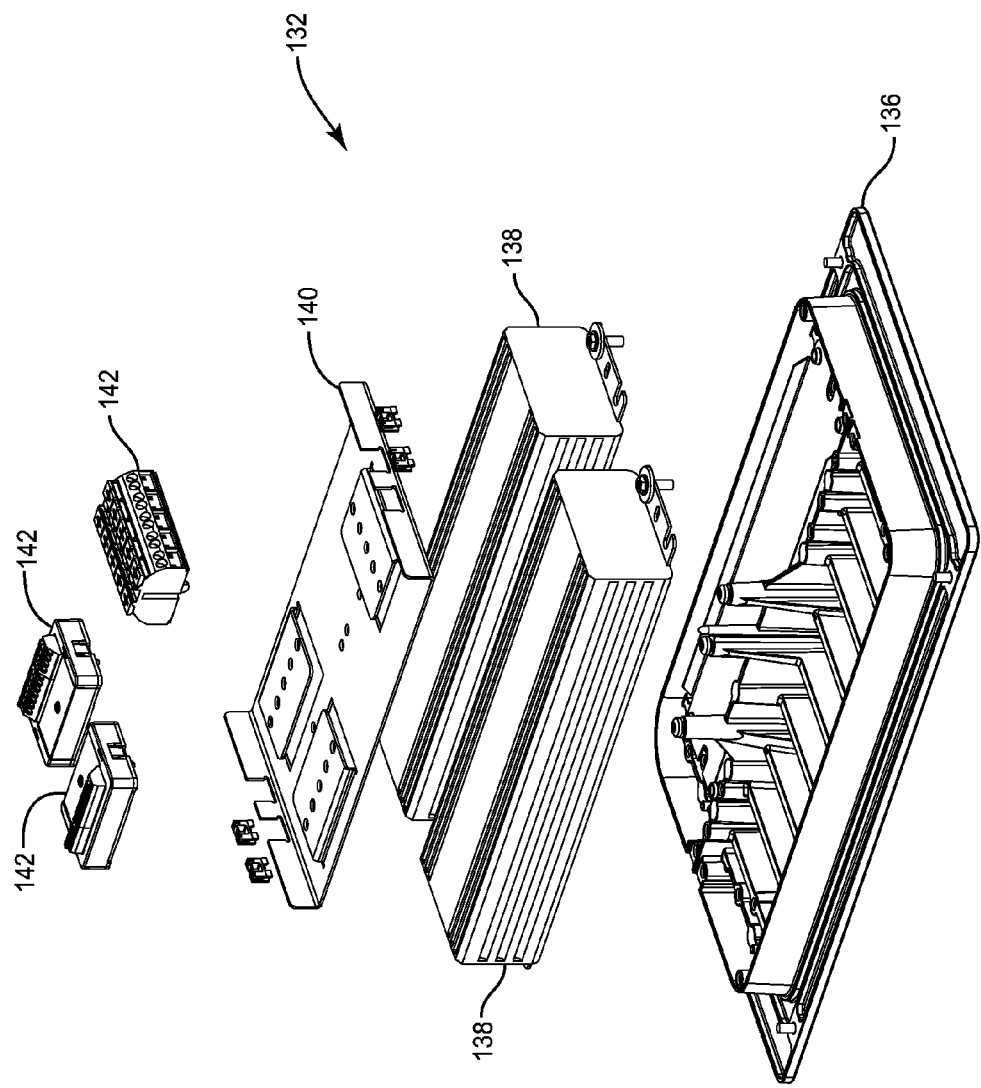
FIG. 15 is an exploded isometric view of the driver circuitry module according to one embodiment of the present disclosure.
Figure 16:
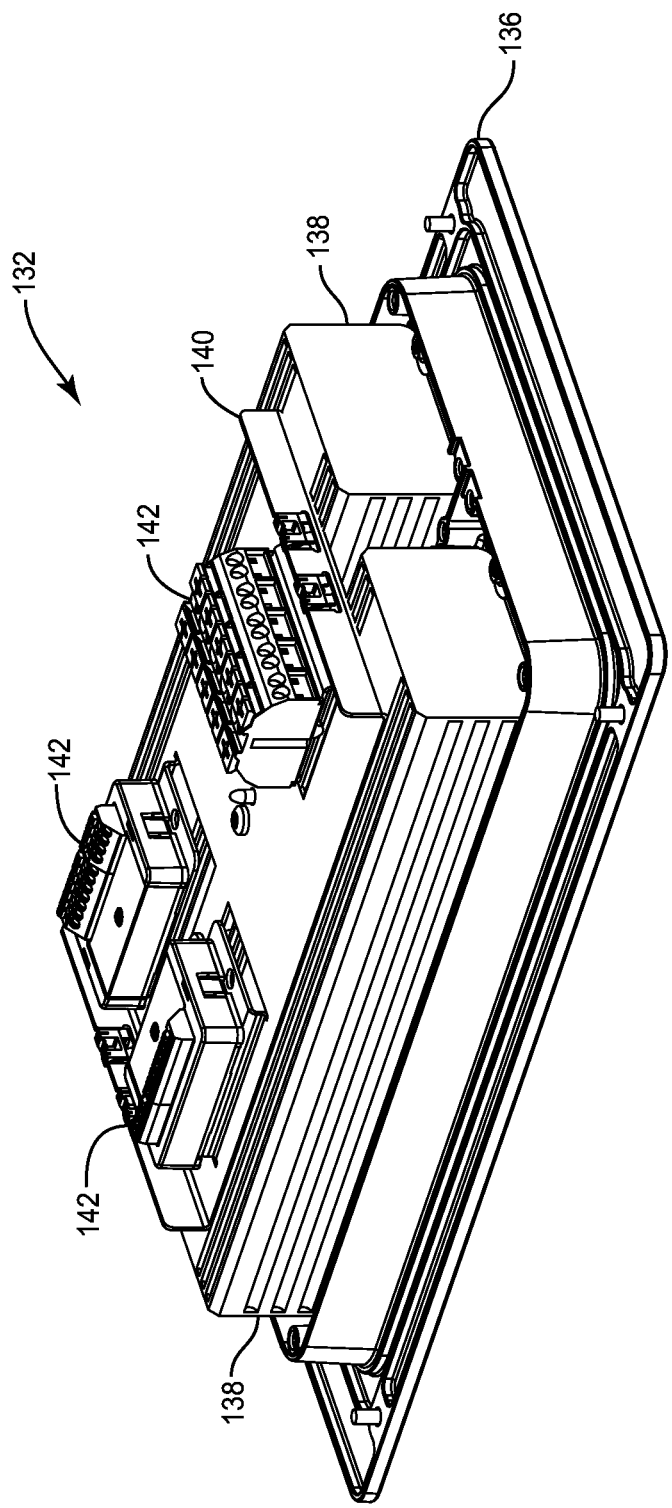
FIG. 16 is an isometric view of the driver circuitry according to one embodiment of the present disclosure.

FIGS. 15 and 16 show details of the driver circuitry module 132 according to one embodiment of the present disclosure. The driver circuitry module 132 includes a mounting plate 136, a number of driver circuitry enclosures 138, a contact substrate 140, and a number of electrical contacts 142. The driver circuitry enclosures 138 may each include the driver circuitry 54 shown above with respect to FIGS. 3 through 10. Each one of the driver circuitry enclosures 138 may be thermally coupled to the driver circuitry 54 therein in order to provide adequate heat dissipation and ensure the longevity of the driver circuitry 54, and further may be coupled to the mounting plate 136. The contact substrate 140 may be mounted on top of the driver circuitry enclosures 138 such that the necessary electrical interconnects between the driver circuitry 54 and the contact substrate 140 are made. Finally, the electrical contacts 142 may be mounted on the contact substrate 140 such that the desired contacts to the driver circuitry 54 are made available for use by the lighting fixture 122.

Those skilled in the art will recognize improvements and modifications to the preferred embodiments of the present disclosure. All such improvements and modifications are considered within the scope of the concepts disclosed herein and the claims that follow.

What is claimed is:

1. Driver circuitry configured to receive an alternating current (AC) input voltage and generate a driver current for driving at least one light emitting diode (LED) in a solid-state lighting fixture such that the driver circuitry operates at an efficiency greater than about 90% when the AC input voltage is between about 185V and 528V.

2. The driver circuitry of claim 1 wherein the driver circuitry operates at an efficiency greater than about 94% at one or more points when the AC input voltage is between 185V and 528V.

3. The driver circuitry of claim 1 wherein one or more switching components in the driver circuitry are silicon carbide (SiC) switching components.

4. The driver circuitry of claim 1 wherein a non-isolated direct current (DC) path exists between an input node of the driver circuitry and the at least one LED in the solid-state lighting fixture.

5. The driver circuitry of claim 1 wherein the driver circuitry comprises:
    rectifier circuitry configured to receive and rectify the AC input voltage to generate a rectified voltage;
    power factor correction (PFC) circuitry coupled to the rectifier circuitry and configured to receive and provide PFC to the rectified voltage to generate a PFC output voltage; and
    DC-DC converter circuitry coupled to the PFC circuitry and configured to receive and regulate a driver output current for driving the at least one LED in the solid-state lighting fixture.

6. The driver circuitry of claim 5 wherein the PFC circuitry is a PFC boost converter.

7. The driver circuitry of claim 6 wherein the PFC boost converter is configured to operate in a continuous conduction mode (CCM).

8. The driver circuitry of claim 6 wherein the PFC boost converter comprises:
    a boost converter input node and a boost converter output node;
    a boost converter inductor coupled between the boost converter input node and an intermediate boost converter node;
    a boost converter switch coupled between the intermediate boost converter node and ground;
    a boost converter diode including an anode coupled to the intermediate boost converter node and a cathode coupled to the boost converter output node; and
    a boost converter capacitor coupled between the boost converter output node and ground.

9. The driver circuitry of claim 8 wherein the boost converter switch and the boost converter diode are silicon carbide (SiC) devices.

10. The driver circuitry of claim 9 wherein the boost converter switch is a field effect transistor (FET) device.

11. The driver circuitry of claim 8 wherein the DC-DC converter circuitry is a buck converter.

12. The driver circuitry of claim 11 wherein the DC-DC converter circuitry comprises:
    a buck converter input node coupled to the boost converter output node and a buck converter output node;
    a buck converter diode including an anode coupled to the buck converter output node and an output coupled to the buck converter input node;
    a buck converter switch coupled between the buck converter output node and ground; and
    a buck converter inductor coupled in series with a buck converter capacitor between the buck converter input node and the buck converter output node.

13. The driver circuitry of claim 12 wherein the buck converter diode and the buck converter switch are silicon carbide (SiC) devices.

14. The driver circuitry of claim 13 wherein the buck converter switch is a field effect transistor (FET) device.

15. The driver circuitry of claim 12 wherein the buck converter switch is coupled to control circuitry configured to selectively change the state of the buck converter switch in order to control a current at the buck converter output node.

16. The driver circuitry of claim 15 wherein the control circuitry is coupled to minimum off-time circuitry configured to limit the minimum amount of time that the buck converter switch is turned off between switching cycles.

17. The driver circuitry of claim 12 wherein the boost converter diode, the boost converter switch, the buck converter diode, and the buck converter switch are silicon carbide (SiC) devices.

18. The driver circuitry of claim 17 wherein the boost converter switch and the buck converter switch are field effect transistor (FET) devices.

19. The driver circuitry of claim 1 wherein the driver circuitry has a power factor greater than about 0.9 for an input power equal to about 500 W.

20. The driver circuitry of claim 1 wherein the driver circuitry has a total harmonic distortion less than about 20% for an input power equal to about 500 W.

21. The driver circuitry of claim 1 wherein the driver circuitry drives the at least one LED with a linear driver current.

22. The driver circuitry of claim 1 wherein the driver circuitry drives the at least one LED with a pulse width modulated (PWM) driver current.

23. Circuitry comprising:
an input node coupled to a power supply;
an output node coupled to at least one LED in a solid-state lighting fixture such that a non-isolated direct current (DC) path exists between the input node and the output node; and
driver circuitry residing in the non-isolated DC path between the input node and the output node and configured to:
receive an AC input voltage from the power supply; and
generate a driver current for driving the at least one LED from the AC input voltage using one or more switching components in the driver circuitry such that the driver circuitry operates at an efficiency greater than about 90% when the AC input voltage is between about 185V and 528V.

24. The circuitry of claim 23 wherein the one or more switching components in the driver circuitry are silicon carbide (SiC) switching components.

25. The circuitry of claim 23 wherein the driver circuitry comprises:
rectifier circuitry configured to receive and rectify the AC input voltage to generate a rectified voltage;
power factor correction (PFC) circuitry coupled to the rectifier circuitry and configured to receive and provide PFC to the rectified voltage to generate a PFC output voltage; and
DC-DC converter circuitry coupled to the PFC circuitry and configured to receive and regulate a driver output current for driving the at least one LED in the solid-state lighting fixture.

26. The circuitry of claim 23 wherein the AC input voltage signal is between about 185V and 528V.

27. The circuitry of claim 23 wherein the driver circuitry has a power factor greater than about 0.9 for an input power equal to about 500 W.

28. The circuitry of claim 23 wherein the driver circuitry has a total harmonic distortion less than about 20% for an input power equal to about 500 W.

* * * * *